United States Patent
Chu et al.

(10) Patent No.: US 10,952,216 B2
(45) Date of Patent: Mar. 16, 2021

(54) WIRELESS LOCAL AREA NETWORK MANAGEMENT

(71) Applicant: Marvell World Trade Ltd., St. Michael (BB)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/526,808

(22) Filed: Jul. 30, 2019

(65) Prior Publication Data

US 2020/0037325 A1 Jan. 30, 2020

Related U.S. Application Data

(60) Provisional application No. 62/792,306, filed on Jan. 14, 2019, provisional application No. 62/736,907, (Continued)

(51) Int. Cl.
*H04W 72/04* (2009.01)
*H04W 74/08* (2009.01)
(Continued)

(52) U.S. Cl.
CPC ....... *H04W 72/0453* (2013.01); *H04L 1/0004* (2013.01); *H04L 5/0098* (2013.01);
(Continued)

(58) Field of Classification Search
CPC ... H04L 1/0004; H04L 5/0098; H04W 74/085
(Continued)

(56) References Cited

U.S. PATENT DOCUMENTS 9,215,055 B2 12/2015 Chu et al.
10,153,857 B1 12/2018 Chu et al.
(Continued)

OTHER PUBLICATIONS

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

(Continued)

*Primary Examiner* — Peter G Solinsky

(57) ABSTRACT

An access point generates a management communication frame, that includes information indicating network parameters of a wireless communication network, for transmission in an operating channel of the wireless communication network. The operating channel including i) at least one primary component channel used at least for synchronizing with client stations associated with the access point and ii) at least one scanning channel specified, by the first communication protocol, to be used for scanning by client stations not associated with the access point. The access point generates a physical layer data unit to include the management communication frame, and transmits the physical layer data unit in the at least one scanning channel, specified by the first communication protocol, to allow discovery of the wireless communication network by client stations that are not associated with the access point.

20 Claims, 14 Drawing Sheets

Related U.S. Application Data filed on Sep. 26, 2018, provisional application No. 62/722,070, filed on Aug. 23, 2018, provisional application No. 62/712,084, filed on Jul. 30, 2018.

(51) Int. Cl.

| | |
|---|---|
| *H04W 8/24* | (2009.01) |
| *H04W 56/00* | (2009.01) |
| *H04W 40/24* | (2009.01) |
| *H04W 80/02* | (2009.01) |
| *H04L 1/00* | (2006.01) |
| *H04L 29/06* | (2006.01) |
| *H04L 5/00* | (2006.01) |
| *H04L 27/26* | (2006.01) |
| *H04W 84/12* | (2009.01) |

(52) U.S. Cl.
CPC .......... *H04L 27/2692* (2013.01); *H04L 69/18* (2013.01); *H04W 8/24* (2013.01); *H04W 40/244* (2013.01); *H04W 56/001* (2013.01); *H04W 72/0446* (2013.01); *H04W 74/085* (2013.01); *H04W 80/02* (2013.01); *H04W 84/12* (2013.01)

(58) Field of Classification Search
USPC .......................................................... 370/329
See application file for complete search history.

(56) References Cited

U.S. PATENT DOCUMENTS

| | | | |
|---|---|---|---|
| 10,367,614 | B2 | 7/2019 | Chu et al. |
| 2016/0028452 | A1* | 1/2016 | Chu .......................... H04L 1/16 375/267 |
| 2016/0050659 | A1* | 2/2016 | Seok ...................... H04L 1/1671 370/338 |
| 2016/0087766 | A1 | 3/2016 | Sun et al. |
| 2016/0295350 | A1* | 10/2016 | Alanen ................ H04W 74/002 |
| 2016/0323426 | A1* | 11/2016 | Hedayat ............ H04W 28/0268 |
| 2018/0103434 | A1* | 4/2018 | Zhou ................... H04W 52/262 |
| 2019/0075491 | A1* | 3/2019 | Ahn ....................... H04L 1/1621 |
| 2019/0132107 | A1* | 5/2019 | Ahn ....................... H04W 74/04 |
| 2019/0238259 | A1* | 8/2019 | Huang .................. H04L 1/0005 |
| 2019/0268892 | A1* | 8/2019 | Gidvani ............... H04B 7/0413 |
| 2020/0092881 | A1* | 3/2020 | Nezou ............... H04W 72/1257 |

OTHER PUBLICATIONS

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

Stacey, "Specification Framework for TGax," doc. IEEE 802.11-15/0132r12, vol. 802.11ax, No. 12, 38 pages (Dec. 1, 2015).

International Search Report and Written Opinion in International Patent Application No. PCT/US2019/044239, dated Oct. 21, 2019 (14 pages).

Liu et al., "A New Integrated Control Algorithm for IEEE 802.11g Standards," 2011 4th IEEE International Conference on Broadband Network and Multimedia Technology (IC-BNMT), pp. 502-506 (Oct. 28, 2011).

Chandra et al., "Beacon-Stuffing: Wi-Fi Without Associations," Eighth IEEE Workshop on Mobile Computing Systems and Applications, pp. 53-57 (Mar. 1, 2007).

U.S. Appl. No. 62/352,719, Chu et al., "MU Resource Request, TID Selection, and Responding Rules," filed Jun. 21, 2016.

U.S. Appl. No. 16/526,759, Chu et al., "Medium Protecion in Wireless Local Area Networks," filed Jul. 30, 2019.

\* cited by examiner

| Element ID 504 | Length 508 | Element ID Extension 512 | HE MAC Capabilities Information 516 | HE PHY Capabilities Information 520 | Supported HE-MCS And NSS Set 524 | PPE Thresholds (Optional) 528 |
|---|---|---|---|---|---|---|
| 1 | 1 | 1 | 6 | 11 | 4, 8 or 12 | Variable |

Octets:

← 500

HE Capabilities Element

*FIG. 5*

| B0 | B1 B7 | B8 B11 | B12 | B13 | B14 | B15 B16 | B17 |
|---|---|---|---|---|---|---|---|
| Reserved | Channel Width Set 604 | Punctured Preamble RX | Device Class | LDPC Coding in Payload | HE SU PPDU With 1x HE-LTF And 0.8μs GI | Midamble Tx/Rx Max NSTS | NDP With 4x HE-LTF And 3.2μs GI |
| Bits: 1 | 7 | 4 | 3 | 1 | 1 | 2 | 1 |

| B69 | B70 B71 | B72 | B73 | B74 | B75 | B76 | B77 | B78 B79 | B80 B87 |
|---|---|---|---|---|---|---|---|---|---|
| Midamble Tx/Rx 2x And 1x HE-LTF | DCM Max BW | Longer Than 16 HE SIG-B OFDM Symbols Support | Non-Triggered CQI Feedback | Tx 1024-QAM < 242-tone RU Support | Rx 1024-QAM < 242-tone RU Support | Rx Full BW SU Using HE MU PPDU With Compressed SIGB | Rx Full BW SU Using HE MU PPDU With Non-Compressed SIGB | 5G/6G Support 608 | Reserved |
| Bits: 1 | 2 | 1 | 1 | 1 | 1 | 1 | 1 | 2 | 8 |

HE PHY Capabilities Information Field

| Element ID 802 | Length 804 | HT Capability Information 806 | A-MPDU Parameters 808 | Supported MCS Set 810 | HT Extended Capabilities 812 | Transmit Beamforming Capabilities 814 | ASEL Capabilities 816 |
|---|---|---|---|---|---|---|---|
| Octets: 1 | 1 | 2 | 1 | 16 | 2 | 4 | 1 |

| Element ID 822 | Length 824 | VHT Capabilities Information 826 | Supported VHT-MCS and Nss Set 828 |
|---|---|---|---|
| Octets: 1 | 1 | 2 | 8 |

| A-MPDU Parameters field 852 | Maximum MPDU Length 854 |
|---|---|

Disallowed Lowest Rate
1000

| Low MCS with Nss0 at 20/40 MHz 1052-1 | Low MCS with Nss1 at 20/40 MHz 1052-2 | Low MCS with Nss2 at 20/40 MHz 1052-3 | Low MCS with Nss0 at 80/160/80+80 MHz 1052-4 | Low MCS with Nss1 at 80/160/80+80 MHz 1052-5 | Low MCS with Nss2 at 80/160/80+80 MHz 1052-6 |

| Element ID | Length | Multi-Band Control | Band ID 1102 | Operating Class | Channel Number | BSSID | Beacon Interval |
|---|---|---|---|---|---|---|---|
| 1 | 1 | 1 | 1 | 1 | 1 | 6 | 2 |

Octets:

| TSF Offset | Multi-Band Connection Capability | FSTSessionTimeout | STA MAC Address (optional) | Pairwise Cipher Suite Count (optional) | Pairwise Cipher Suite List (optional) |
|---|---|---|---|---|---|
| 8 | 1 | 1 | 0 or 6 | 0 or 2 | 4 x m |

Octets:

Multi-band Element

*FIG. 11*

| Band ID value | Meaning |
|---|---|
| 0 | TV White spaces |
| 1 | Sub-1 GHz (excluding TV white spaces) |
| 2 | 2.4 GHz |
| 3 | 3.6 GHz |
| 4 | 4.9 and 5 GHz |
| 5 | 60 GHz |
| 6 | 6 GHz |
| 7-255 | Reserved |

*FIG. 12*

WIRELESS LOCAL AREA NETWORK MANAGEMENT

CROSS REFERENCES TO RELATED APPLICATIONS

The present application claims the benefit of the following U.S. Provisional Patent Applications:

U.S. Provisional Patent Application No. 62/712,084, entitled "High Efficiency (HE) Operation at 6 GHz Band," filed on Jul. 30, 2018;

U.S. Provisional Patent Application No. 62/722,070, entitled "High Efficiency (HE) Operation at 6 GHz Band," filed on Aug. 23, 2018;

U.S. Provisional Patent Application No. 62/736,907, entitled "High Efficiency (HE) Operation at 6 GHz Band," filed on Sep. 26, 2018; and U.S. Provisional Patent Application No. 62/792,306, entitled "High Efficiency (HE) Operation at 6 GHz Band," filed on Jan. 14, 2019.

Additionally, this application is related to U.S. patent application Ser. No. 16/526,753, entitled "Medium Protection in Wireless Local Area Networks," filed on the same day as the present application.

The disclosures of all of the above-referenced patent applications are hereby incorporated by reference herein in their entireties.

FIELD OF TECHNOLOGY

The present disclosure relates generally to wireless communication systems, and more particularly to managing operation in a wireless communication network.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard now in the final stage of development significantly improves throughput over the IEEE 802.11ac Standard.

Communication devices (e.g., access points (APs)) that manage a WLAN often transmit management frames, such as beacon frames, to announce the presence of a WLAN and to allow other communication devices (e.g. client stations) to discover the WLAN. In a typical WLAN, such management frames are transmitted over only a primary channel of the wireless network. Communication devices that are seeking to discover a network and that are not aware of a frequency location of the primary channel of the network are typically configured to scan through all channels available for operation of the network until at least one management frame, that is transmitted in a primary channel of a network, is received by the communication device.

SUMMARY

In an embodiment, a method for announcing presence of a wireless communication network managed by an access point configured for operating according to at least a first communication protocol includes: generating, at the access point, a management communication frame that includes information indicating network parameters of the wireless communication network, the management communication frame including information announcing an operating channel of the wireless communication network, the operating channel including i) at least one primary component channel used at least for synchronizing with client stations associated with the access point and ii) at least one scanning channel specified, by the first communication protocol, to be used for scanning by client stations not associated with the access point; generating, at the access point, a physical layer data unit to include the management communication frame; and transmitting, by the access point, the physical layer data unit to allow discovery of the wireless communication network by client stations that are not associated with the access point.

In another embodiment, an access point configured for operation according to at least a first communication protocol comprises a network interface device having one or more integrated circuit (IC) devices, wherein the one or more IC devices are configured to: generate a management communication frame that includes information indicating network parameters of the wireless communication network, the management communication frame including information announcing an operating channel of the wireless communication network, the operating channel including i) at least one primary component channel used at least for synchronizing with client stations associated with the access point and ii) at least one scanning channel specified, by the first communication protocol, to be used for scanning by client stations not associated with the access point, generate a physical layer data unit to include the management communication frame, and transmit the physical layer data unit to allow discovery of the wireless communication network by client stations that are not associated with the access point.

BRIEF DESCRIPTION OF THE DRAWINGS

FIG. 5 is a diagram of an example capabilities element for advertising capabilities of a communication device in the WLAN of FIG. 1, according to an embodiment.

FIG. 6 is a diagram of a PHY capabilities information field of a capabilities element for advertising capabilities of a communication device in the WLAN of FIG. 1, according to an embodiment.

FIGS. 8A-8C are diagrams of capabilities elements for conveying capabilities of a communication device in the WLAN of FIG. 1, according to embodiments.

FIG. 10A is a diagram of a disallowed lowest rate subfield included in an operation element transmitted in the WLAN of FIG. 1, according to an embodiment.

FIG. 10B is a block diagram of another disallowed lowest rate subfield included in an operation element transmitted in the WLAN of FIG. 1, according to another embodiment.

FIG. 11 is a diagram of a multi-band element for conveying frequency bands parameters of a communication device in the WLAN of FIG. 1, according to an embodiment.

FIG. 12 is a table listing example values and corresponding interpretations of a band ID field of the multi-band element of FIG. 11, according to an embodiment

DETAILED DESCRIPTION

Figure 1:
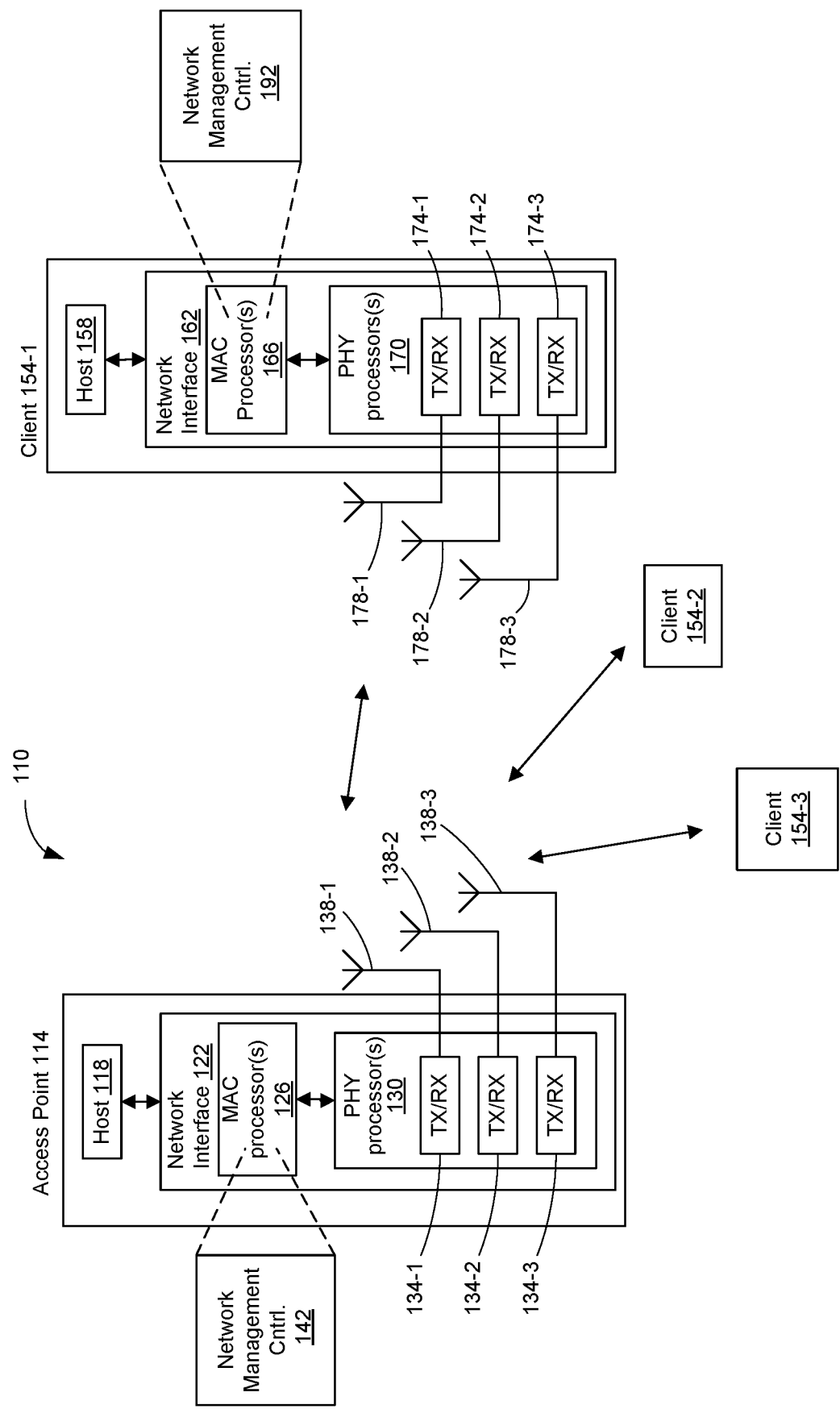
FIG. 1 is a block diagram of an example wireless local area network (WLAN) that operates at least in a first frequency band, according to an embodiment.

In embodiments described below, a wireless communication device such as an access point (AP) or a client station in a wireless network, such as a wireless local area network (WLAN) managed by the AP, is configured to operate i) in at least a first frequency band and ii) according to at least a first communication protocol. For example, in an embodiment, the first communication protocol is the IEEE 802.11ax Standard, now in the final stages of being standardized, and the first frequency band is a 6 GHz band (5.925 to 7.125 GHz) recently released by the Federal Communication Commission (FCC) for WLAN operation. In some embodiments, the wireless communication device is additionally configured to operate i) in a second frequency band and/or a third frequency band and/or ii) according to a second communication protocol, according to a third communication protocol and/or according to a fourth communication protocol. For example, in an embodiment, the second frequency band is the 5 GHz band (approximately 5.170 to 5.835 GHz) and the third frequency band is the 2.4 GHz band (approximately 2.4 to 2.5 GHz). As an example, in an embodiment, the second communication protocol is the IEEE 802.11ac Standard, the third communication protocol is the IEEE 802.11n Standard, and the fourth communication protocol is the IEEE 802.11a Standard. The second communication protocol, the third communication protocol and the fourth communication protocol are legacy communication protocols with respect to the first communication protocol, in an embodiment. The fourth communication protocol is legacy with respect to the first communication protocol, the second communication protocol, and the third communication protocol, in an embodiment. In an embodiment, transmissions (e.g., data units that include control information, management information and/or data) that conform to the first communication protocol (e.g., conform to a physical layer data unit format specified by the first communication protocol) and transmissions (e.g., at least data units that include control information) that conform to the fourth communication protocol (e.g., conform to a physical layer data unit format specified by the fourth communication protocol) are allowed in the first frequency band. On the other hand, transmissions (e.g., data units that include control information, management information and/or data) that conform to the second communication protocol (e.g., conform to a physical layer data unit format specified by the second communication protocol) and transmissions (e.g., data units that include control information, management information and/or data) that conform to the third communication protocol (e.g., conform to a physical layer data unit format specified by the third communication protocol) are not allowed in the first frequency band, in an embodiment.

In an embodiment, the WLAN managed by the AP operates using an operating channel that comprises one or more component channels. In an embodiment, each component channel spans a respective frequency bandwidth portion of an overall frequency bandwidth of the operating channel of the AP. At least one component channel of the one or more component channels of the operating channel is designated as a primary channel of the operating channel of the AP, and one or more other component channels are designated as non-primary (e.g., secondary) component channels of the operating channel of the AP. The AP utilizes primary channels for various operations, such as for transmission of various management transmissions (e.g., transmissions associated with association of a client station with the AP, beacon transmissions by the AP, operating channel bandwidths switch announcement transmissions, etc.), for conducting clear channel assessment (CCA) procedures, etc. The AP utilizes the primary and/or secondary channels for packet transfers with other WLAN communication devices (e.g., transferring user data to client stations). In current WLANs, the AP generally reserves a primary channel for management operations associated with the WLAN 110 and does not use the secondary channels for the management operations.

In an embodiment, the wireless communication device (e.g., the AP) occasionally transmits wireless network management information to allow client stations associated with the AP to synchronize with the AP and to allow client stations that are not associated with the AP to discover presence of the WLAN managed by the AP and to subsequently associate with the AP. In current wireless networks in which an AP manages a WLAN with an operating channel that comprises multiple component channels, the AP typically transmit such management frames in only a primary component channel of the multiple component channels. Client stations that are associated with the AP are configured to listen for the management frames in the primary component channels of the operating channel of the AP, and to obtain management information from the management frames received in the primary component channel of the operating channel of the AP. Client stations that are not associated with the AP and are seeking to discover the WLAN managed by the AP typically scan each available channel, listening on each channel for a period of time and switching to the next channel if no management frame is received in the current channel. In one aspect of the present disclosure, to reduce the number of channels that need to be scanned to discover a wireless network, the first communication protocol specifies a set of scanning channels that includes a subset of all available channels.

In an embodiment, the AP is configured to transmit management frames (e.g., a beacon frame) in a scanning channel that does not necessarily correspond to a primary channel of an operating channel of the AP to allow scanning client stations to discover the wireless network managed by the AP. For example, the scanning channel corresponds to a non-primary (e.g., a secondary) component channel of the operating channel of the AP, in an embodiment. In another embodiment, the scanning channel corresponds to the primary channel of the operating channel. For example, the first communication protocol specifies that the primary channel should correspond to a scanning channel specified by the first communication protocol, in an embodiment. The primary channel of the operating channel In some embodiments, the AP is configured to transmit management frames (e.g., a beacon frame) in duplicate mode, in which duplicates of the physical data unit are simultaneously transmitted in the primary component channel of the operating channel of the wireless network and in the scanning channel that corresponds to the secondary component channel of the operating channel of the wireless network. Simultaneous transmission of the management frame in the primary component channel of the operating channel of the wireless network and in the scanning channel that corresponds to the secondary component channel of the operating channel of the wireless network allows the AP to simultaneously allow i) client stations that are associated with the AP to synchronize with the AP and ii) client stations that are not associated with the AP to discover the presence of the wireless network managed by the AP, in an embodiment.

In current wireless networks, APs typically transmit such management frames using legacy physical layer formats, and according to legacy management frame transmission rules (e.g., using the lowest legacy data rate) to allow legacy client stations to discover the wireless networks. In another aspect of the present disclosure, the AP is configured to transmit management frames in non-legacy physical layer formats in at least some situations. For example, the AP is configured to transmit management frames in non-legacy physical layer formats and/or according to non-legacy management frame transmission rules when transmitting the management frames in the first frequency band in which legacy client stations are not supported. On the other hand, in an embodiment, the AP is configured to transmit management frames in the legacy physical layer format when transmitting the management frames in the second and/or the third frequency bands in which operation according to the legacy communication protocols is supported. Transmitting the management frames using a non-legacy physical layer format and/or non-legacy management frame transmission rules when transmitting the management frames in the first frequency band allows the AP to transmit the management frames more robustly and/or more efficiently in the first frequency band. For example, the AP is configured to utilize an extended range non-legacy physical layer format and/or to utilize a higher transmission rate as compared to the lowest legacy transmission rate when transmitting the management frames in the first frequency band, in various embodiments.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the network interface device 122 is configured for operation within a single RF band at a given time. In another embodiment, the network interface device 122 is configured for operation within two or more RF bands at the same time or at different times. In an embodiment, the network interface device 122 implements multiple APs (e.g., co-located APs), respective APs operating in respective ones of the frequency bands. For example, in an embodiment, the network interface device 122 includes multiple PHY processors 130, where respective PHY processors 130 correspond to respective ones of the co-located APs for operation in respective ones of the frequency bands. In another embodiment, the network interface device 122 includes a single PHY processor 130, where each transceiver 134 includes respective RF radios corresponding to respective ones of the co-located APs for operation in respective ones of the frequency bands. In an embodiment, the network interface device 122 includes multiple MAC processors 126, where respective MAC processors 126 correspond to respective ones of the co-located APs for operation in respective ones of the frequency bands. In another embodiment, the network interface device 122 includes a single MAC processor 126 corresponding to the multiple co-located APs for operation in respective ones of the frequency bands.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PHY protocol data unit (PPDU) to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes, or implements, a network management controller 142. The network management controller 142 manages operation of the AP 114 in at least the first frequency band (e.g., the 6 GHz band). In some embodiments, the network controller 142 additionally manages operation of the AP 114 in one or more additional frequency bands, such as the second frequency band (e.g., the 5 GHz band) and/or the third frequency band (e.g., the 2.4 GHz band).

As will be described in more detail below, the network management controller 142 generates a management frame (e.g., a beacon frame, a probe response frame, an association response frame, a reassociation response frame, etc.) that includes information indicating capabilities of the AP 114 and/or network management parameters associated with a basic service set (BSS) managed by the AP 114, and prompts the PHY processor 130 to transmit the management frame to client stations 154 to allow with client stations 154 associated with the AP 114 to synchronize with the AP 114 and to allow other client stations 154 that are not associated with the AP 114 to discover presence of the BSS managed by the AP 114. In various embodiments, the network management controller 142 prompts the PHY processor 130 to transmit the management frame in a particular PHY format depending on the particular frequency band in which the management frame is to be transmitted. In some embodiments, the format of the management frame itself and/or the information included in the management frame depends on the particular frequency band in which the management frame is transmitted. For example, in an embodiment, when the management frame is to be transmitted in the second frequency band or in the third frequency, the network management controller 142 generates the management frame to include one or more legacy capability fields that conform to one or more legacy formats (e.g., an HT capabilities element, a VHT capabilities element, etc.) specified by the second communication protocol and/or the third communication protocol. On the other hand, when the management frame is to be transmitted in the first frequency band, the network management controller 142 generates the management frame to exclude the one or more legacy capability fields and to instead include, in a capabilities element specified by the first communication protocol for signaling network management parameters in the first frequency band, one or more subfields corresponding to one or more subfields included in the one or more legacy capability fields, in an embodiment.

In an embodiment, the network management controller 142 prompts the PHY processor 130 to transmit the management frame in at least a scanning channel of an operating channel of the BSS managed by the AP 114, where the scanning channel does not necessarily correspond to a primary component channel of the BSS managed by the AP 114. In an embodiment, in at least some situations, the network management controller 142 prompts the PHY processor 130 to transmit the management frame in duplicate PHY mode, in which the PHY processor 130 simultaneously transmits duplicates of the management frame, where a first duplicate of the management frame is transmitted in a primary component channel of the operating channel of the BSS managed by the AP 114 and a second duplicate of the management frame is simultaneously transmitted in the scanning channel that corresponds to a secondary component channel of the operating channel of the BSS managed by the AP 114 so that i) client stations that are associated with the AP 114 can receive the management frame in the primary component channel of the operating channel of the BSS managed by the AP 114 and ii) client stations that are not associated with the AP 114 can receive the management frame in the scanning channel that corresponds to the secondary component channel of the operating channel of the BSS managed by the AP 114. In an embodiment, the use of a duplicate PHY mode for transmission of management frames is limited to operation in the first frequency band. Thus, for example, the network management controller 142 is configured to prompt the PHY processor 130 to transmit a management frame in the duplicate PHY mode if the management frame is to be transmitted in the first frequency band, in at least some situations. On the other hand, the network management controller 142 is configured to prompt the PHY processor 130 to transmit the management frame in non-duplicate PHY format if the management frame is to be transmitted in the second frequency band or in the third frequency band, in an embodiment.

In an embodiment, the network management controller 142 is implemented by a processor executing machine readable instructions stored in a memory, where the machine readable instructions cause the processor to perform acts described in more detail below. In another embodiment, the network management controller 142 additionally or alternatively comprises one or more hardware state machines that are configured to perform acts described in more detail below.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the network interface device 162 is configured for operation within a single RF band at a given time. In another embodiment, the network interface device 162 is configured for operation within two or more RF bands at the same time or at different times. In an embodiment, the network interface device 162 implements multiple APs (e.g., co-located client stations), respective client stations operating in respective ones of the frequency bands. For example, in an embodiment, the network interface device 162 includes multiple PHY processors 170, where respective PHY processors 170 correspond to respective ones of the co-located client stations for operation in respective ones of the frequency bands. In another embodiment, the network interface device 162 includes a single PHY processor 170, where each transceiver 174 includes respective RF radios corresponding to respective ones of the co-located client stations for operation in respective ones of the frequency bands. In an embodiment, the network interface device 162 includes multiple MAC processors 166, where respective MAC processors 166 correspond to respective ones of the co-located client stations for operation in respective ones of the frequency bands. In another embodiment, the network interface device 162 includes a single MAC processor 166 corresponding to the multiple co-located client stations for operation in respective ones of the frequency bands.

The network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 126 includes, or implements, a network management controller 192. The network management controller 192 manages operation of the client station 154-1 in at least the first frequency band (e.g., the 6 GHz frequency band). In some embodiments, the network management controller 192 additionally manages operation of the client station 154-1 in one or more additional more of the second frequency band (e.g., the 5 GHz frequency band) and the third frequency band (e.g., the 2.4 GHz frequency band), in various embodiments.

As will be described in more detail below, the network management controller 192 generates a management frame (e.g., such as a probe request frame, an association request frame, a request response frame, etc.) that includes information indicating capabilities of the client station 154-1, and prompts the PHY processor 170 to transmit the management frame to the AP 114 to advertise capabilities of the client station 154-1 to the AP 114. In various embodiments, the network management controller 192 prompts the PHY processor 170 to transmit the management frame in a particular PHY format depending on the particular frequency band in which the management frame is to be transmitted. In some embodiments, the format of the management frame itself and/or the information included in the management frame depends on the particular frequency band in which the management frame is transmitted. For example, when the management frame is to be transmitted in the second frequency band or in the third frequency, the network management controller 192 generates the management frame to include one or more legacy capability fields that conform to one or more legacy formats (e.g., an HT capabilities element, a VHT capabilities element, etc.) specified by the second communication protocol and/or the third communication protocol, in an embodiment. On the other hand, when the management frame is to be transmitted in the first frequency band, the network management controller 192 generates the management frame to exclude the one or more legacy capability fields and to instead include relevant information from the one or more legacy capability fields in a capabilities element specified by the first communication protocol for signaling network management parameters in the first frequency band.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, at least one of the client stations 154 in the WLAN 110 is i) a legacy client station that is configured to operate according to one or more legacy communication protocols but not the first communication protocol and ii) is operating in the second frequency band and/or the third frequency band. On the other hand, the WLAN 110 does not includes any legacy client stations 154 that are not configured to operate according to the first communication protocol and that are operating in the first frequency band, in an embodiment.

Figure 2:
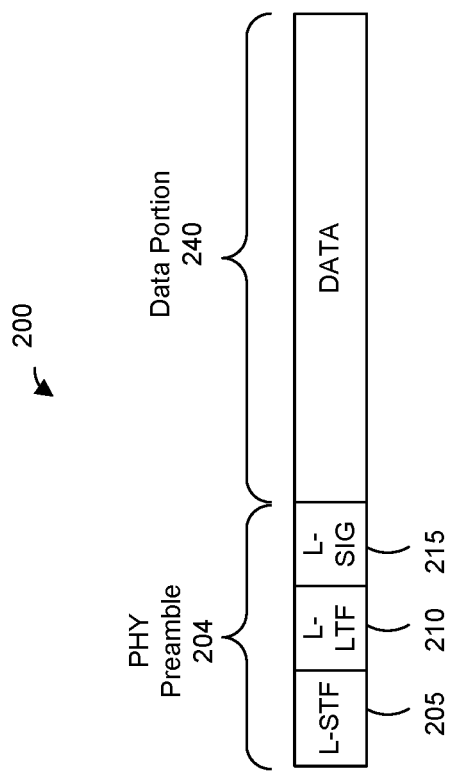
FIG. 2 is a block diagram of an example physical layer (PHY) data unit transmitted by communication devices in the WLAN of FIG. 1, according to an embodiment.

FIG. 2 is a diagram of an example PPDU 200 that the network interface device 122 (FIG. 1) is configured to generate and transmit to one or more client stations 154 (e.g., the client station 154-1), according to an embodiment. If the PPDU is transmitted by a client station 154, the network interface device 122 (FIG. 1) is also configured to receive and process the PPDU 200, according to an embodiment.

The network interface device 162 (FIG. 1) is also be configured to generate and transmit the PPDU 200 to the AP 114, according to an embodiment. If the PPDU is transmitted by the AP 114, the network interface device 162 (FIG. 1) is also configured to receive and process the PPDU 200, according to an embodiment.

The PPDU 200 conforms to a legacy physical layer format. In an embodiment, the PPDU 200 is referred to as a non-high-throughput (non-HT) PHY data unit. The PPDU 200 occupies a 20 MHz bandwidth or another suitable bandwidth, in an embodiment. Data units similar to the PPDU 200 occupy other suitable bandwidths that correspond to an aggregation of multiple component channels (e.g., each having a 20 MHz bandwidth or another suitable bandwidth), in other embodiments.

The PPDU 200 includes a PHY preamble 204 and a PHY data portion 208. The PHY preamble 204 conforms to a legacy PHY preamble format and includes a legacy short training field (L-STF) 205, a legacy long training field (L-LTF) 210, a legacy signal field (L-SIG) 215, in an embodiment. The L-STF 205 generally includes information that is useful for packet detection and synchronization, whereas the L-LTF 210 generally includes information that is useful for channel estimation and fine synchronization. The L-SIG 215 generally signals PHY parameters to the receiving devices, including legacy devices, such as a length of the PPDU 300. In an embodiment, the PHY preamble 204 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200. The PPDU 200 also includes a PHY data portion 240, in an embodiment. The PHY data portion 240 includes an MPDU, in an embodiment. In some scenarios, the PPDU 200 may omit the data portion 240.

In an embodiment, the PHY data portion 240 includes a management frame (e.g., a beacon frame) that includes information indicating network management parameters of a BSS managed by the AP 114. In an embodiment, when the PPDU 200 is transmitted in the first frequency band and the PHY data portion 240 includes the management frame, a first duplicate of the PPDU 200 is transmitted in a primary component channel of an operating channel the BSS managed by the AP 114 and a second duplicate of the PPDU 200 is transmitted in a scanning channel that corresponds to a secondary component channel of the BSS managed by the AP 114.

Figure 3:
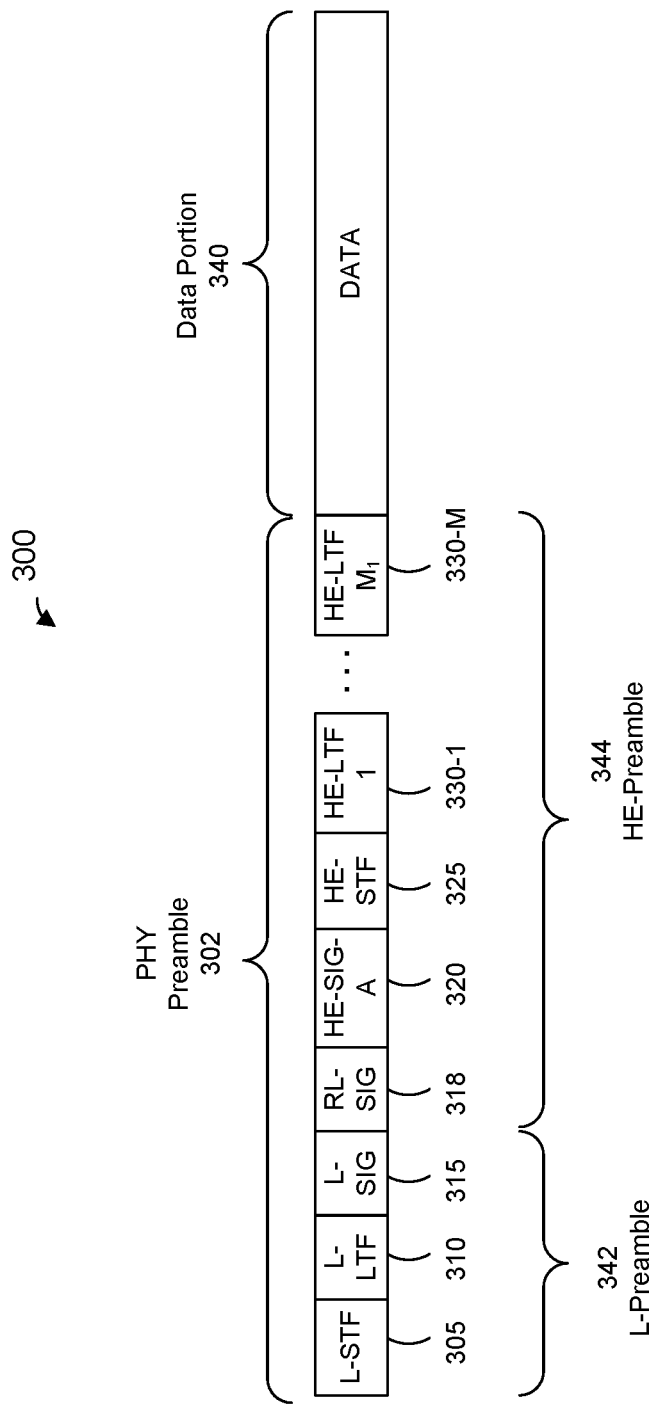
FIG. 3 is a block diagram of another example physical layer (PHY) data unit transmitted by communication devices in the WLAN of FIG. 1, according to an embodiment.

FIG. 3 is a diagram of an example PPDU 300 that the network interface device 122 (FIG. 1) is configured to generate and transmit to one or more client stations 154 (e.g., the client station 154-1), according to an embodiment. If the PPDU is transmitted by a client station 154, the network interface device 122 (FIG. 1) is also configured to receive and process the PPDU 300, according to an embodiment.

The network interface device 162 (FIG. 1) is also be configured to generate and transmit the PPDU 300 to the AP 114, according to an embodiment. If the PPDU is transmitted by the AP 114, the network interface device 162 (FIG. 1) is also configured to receive and process the PPDU 300, according to an embodiment.

The PPDU 300 includes a preamble 302 including a legacy short training field (L-STF) 305, a legacy long training field (L-LTF) 310, a legacy signal field (L-SIG) 315, a repeated L-SIG field (RL-SIG) 318, a high efficiency (HE) signal field (HE-SIG-A) 320, an HE short training field (HE-STF) 325, and M HE long training fields (HE-LTFs) 330, where M is a suitable positive integer. In an embodiment, M generally corresponds to (e.g., is greater than or equal to) a number of spatial streams via which the data unit 300 will be transmitted. A legacy preamble portion 342 of the preamble 302 includes the L-STF 305, L-LTF 310 and L-SIG 315. An HE preamble portion 344 of the preamble 302 includes the RL-SIG 318, the HE-SIG-A 320, the HE-STF 325 and the M HE-LTFs 330. The data unit 300 also includes a data portion 340. In some scenarios, the PPDU 300 may omit the data portion 340.

The L-STF 305 generally includes information that is useful for packet detection and synchronization, whereas the L-LTF 310 generally includes information that is useful for channel estimation and fine synchronization. The L-SIG 315 generally signals PHY parameters to the receiving devices, including legacy devices, such as a length of the PPDU 300.

The HE-STF 325 generally includes information that is useful for improving automatic gain control estimation in a MIMO transmission. The HE-LTFs 330 generally includes information that is useful for estimating a MIMO channel.

In some embodiments, the preamble 302 omits one or more of the fields 305-330. In some embodiments, the preamble 302 includes additional fields not illustrated in FIG. 2.

Each of the L-STF 305, the L-LTF 310, the L-SIG 315, the RL-SIG 318, the HE-SIG-A 320, the HE-STF 325, and the M HE-LTFs 330 comprises one or more OFDM symbols. As merely an illustrative example, the HE-SIG-A 320 comprises two OFDM symbols.

In the illustration of FIG. 2, the PPDU 300 includes one of each of the L-STF 305, the L-LTF 310, the L-SIG 315, the RL-SIG 318 and the HE-SIG-A 320. In some embodiments in which a data unit similar to the data unit 300 occupies a cumulative bandwidth other than 20 MHz, each of the L-STF 305, the L-LTF 310, the L-SIG 315, the RL-SIG 318, and the HE-SIG-A 320 is repeated over a corresponding number of 20 MHz sub-bands of the whole bandwidth of the data unit, in an embodiment. For example, in an embodiment in which the data unit occupies an 80 MHz bandwidth, the PPDU 300 includes four of each of the L-STF 305, the L-LTF 310, the L-SIG 315, the RL-SIG 318, and the HE-SIG-A 320 in respective 20 MHz sub-bands.

In an embodiment, the HE-SIG-A 320 generally carries information about the format of the PPDU 300, such as information needed to properly decode at least a portion of the PPDU 300, in an embodiment. In some embodiments, HE-SIG-A 320 additionally includes information for receivers that are not intended receivers of the PPDU 300, such as information needed for medium protection, spatial reuse, etc.

In some embodiments, a format similar to the format in FIG. 3 is defined for an extended range (ER) SU PPDU. In an embodiment, an ER SU PPDU is the same as the PPDU 300 of FIG. 3 except that a duration of an HE-SIG-A field of the ER SU PPDU is twice the duration of the HE-SIG-A 320. For example, in an embodiment, information in the HE-SIG-A field 320 is included twice so that the duration of the HE-SIG-A field in the extended range SU PPDU is twice the duration of the HE-SIG-A 320.

Additionally, for an ER SU PPDU, transmit power is boosted for certain fields (and/or certain OFDM tones of certain fields) of the preamble 302 as compared to a transmit power of other fields/portions of the ER SU PPDU, such as the data portion 340, according to some embodiments. For example, a transmit power boost of 3 decibels (dB) is applied to one of, or any suitable combination of two or more of, L-STF 305, L-LTF 310, HE-STF 325, and/or HE-LTF(s) 330, as compared to a transmit power of other fields/portions of the extended range SU PPDU, such as the data portion 340, according to some embodiments. Such a transmit power boost to fields such as L-STF 305, L-LTF 310, HE-STF 325, and/or HE-LTF(s) 330, help to improve packet detection, synchronization, channel estimation, etc., for communication devices separated by greater distances.

In an embodiment, the AP 114 and a plurality of client stations 154 are configured for multiple user (MU) communication using orthogonal frequency division multiple access (OFDMA) transmissions. In an embodiment, the PPDU 300 is an MU OFDMA data unit in which independent data streams are transmitted to or by multiple client stations 154 using respective sets of OFDM tones allocated to the client stations 154. For example, in an embodiment, available OFDM tones (e.g., OFDM tones that are not used as DC tones and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 300 is an MU-MIMO PHY data unit in which independent data streams are simultaneously transmitted to or by multiple client stations 154 using respective spatial streams allocated to the client stations 154.

In various embodiments, the first communication protocol permits use of only some PHY formats for transmission of PPDUs in the first frequency band. For example, in an embodiment, the first communication protocol permits PHY formats that conform to the first communication protocol (e.g., HE PPDUs such as the PPDU 300 of FIG. 3) and the PHY format that conforms to the fourth communication protocol (e.g., non-HT PPDU) to be utilized in the first frequency band and disallows PHY formats that conform to the second communication protocol (e.g., VHT PPDUs) and third communication protocol (e.g., HT PPDUs) to be utilized in the first frequency band. The PHY format that conforms to the fourth communication protocol (e.g., non-HT PPDU) is used for transmission of control frames, in at least some situations, in an embodiment. Permitting the PHY format that conforms to the fourth communication protocol for transmission of control frames simplifies implementation of multiple co-located communication devices (e.g., APs or client stations) within a single communication device, in an embodiment. For example, in an embodiment in which control frames are transmitted using the PHY format that conforms to the fourth communication protocol in the second frequency and and/or the third frequency band, permitting the PHY format that conforms to the fourth communication protocol for transmission of control frames in the first frequency band facilitate the use of a single MAC processor of the communication device to implement MAC functions for operation of multiple co-located communication devices i) in the first frequency band and ii) in the second and/or third frequency band, in at least some embodiments.

In another embodiment, the first communication protocol permits PHY formats that conform to the first communication protocol (e.g., HE PPDUs such as the PPDU 300 of FIG. 3) to be utilized in the first frequency band and disallows PHY formats that conform to the second communication protocol (e.g., VHT PPDUs) and the third communication protocol (e.g., HT PPDUs) to be utilized in the first frequency band. In another embodiment, the first communication protocol permits PHY formats that conform to the first communication protocol (e.g., HE PPDUs such as the PPDU 300 of FIG. 3) and PHY formats that conform to the second communication protocol (e.g., VHT PPDUs) to be utilized in the first frequency band and disallows PHY formats that conform to the third communication protocol (e.g., HT PPDUs) to be utilized in the first frequency band. In yet another embodiment, the first communication protocol permits PHY formats that conform to the first communication protocol (e.g., HE PPDUs such as the PPDU 300 of FIG. 3), PHY formats that conform to the second communication protocol (e.g., VHT PPDUs) and PHY formats that conform to the fourth communication protocol (e.g., non-HT PPDU) to be utilized in the first frequency band and disallows PHY formats that conform to the third communication protocol (e.g., HT PPDUs) to be utilized in the first frequency band. In another embodiment, the first communication protocol permits use of non-legacy PHY formats and well as all legacy PHY formats for transmission of PPDUs in the first frequency band. In an embodiment, the AP 114 is configured to dynamically allow and/or disallow various PHY formats to be utilized in the first frequency band, for example depending on types and capabilities of client stations operating in the WLAN 110 at a given time.

In an embodiment, a communication device (e.g., the AP 114 or the client station 154-1) utilizes the PHY format of the PPDU 300 to transmit, in the first frequency band, a management frame (e.g., a beacon frame, a probe request frame, a probe response frame, an association request frame, an association response frame, etc.). For example, the PHY data portion 340 includes a management frame in at least some scenarios when the PPDU 300 is transmitted in the first frequency band. In an embodiment, the communication device utilizes SU PHY format of the PPDU 300 to transmit the management frame. In another embodiment, in at least some situations, the communication device utilizes extended range SU PHY format of the PPDU 300 to transmit the management frame, for example when the management frame cannot be reliably transmitted using the SU PHY format of the PPDU 300. For example, in an embodiment, the communication device utilizes the SU PHY format of the PPDU 300 for transmission of a management frame in a non-extended range BSS and utilizes the ER SU PHY format of the PPDU 300 for transmission of a management frame in an extended-range BSS. In an embodiment, a single user PPDU that includes a management frame spans a bandwidth no wider the bandwidth of a single component channel (e.g., a 20 MHz component channel) of a communication channel. In some embodiments, to cover multiple component channels of a communication channel, a duplicate PHY mode in which duplicates of the management frame are included in respective single user PPDUs that are simultaneously transmitted in respective ones of the multiple component channels of the communication channel.

In yet another embodiment, the communication device utilizes MU PHY format of the PPDU 300 to transmit the management frame. For example, the communication device transmits the management frame in a single RU that does not exceed a 20 MHz bandwidth, in an embodiment. In another embodiment, the communication device transmits the management frame that spans a bandwidth wider than a 20 MHz bandwidth in at least some scenarios. For example, in an embodiment, the first communication protocol specifies that an AP can transmit a management frame that spans a bandwidth wider than a 20 MHz bandwidth so long as the wider bandwidth does not exceed operating bandwidth of any client station 154 associated with the AP 114. In this embodiment, in a scenario in which the narrowest operating channel among client stations 154 associated with the AP 114 is 40 MHz, the AP 114 can transmit a management frame (e.g., a beacon frame, a probe response frame, an association response frame, etc.) that spans a 40 MHz bandwidth, but cannot transmit the management frame that spans a wider bandwidth such as an 80 MHz bandwidth, in an embodiment.

In an embodiment, when PPDU 300 includes the management frame and is transmitted in the first frequency band, the PPDU 300 is transmitted using a mandatory modulation and coding scheme (MCS) and a single spatial stream (Nss=1). The mandatory MCS is selected from a set of mandatory MCSs specified by the first communication protocol, in an embodiment. In another embodiment, an MCS (e.g., the lowest-order MCS) selected from a basic MCS set specified for transmission in the BSS and a single spatial stream (Nss=1) are utilized. In an embodiment, the PPDU 300 that includes the management frame occupies a 20 MHz bandwidth. For example, in the embodiment, the first communication protocol specifies that management frame transmission occupies a 20 MHz bandwidth.

In an embodiment, the PPDU 300 (e.g., the HE-SIG-A field 320) includes a BSS color identifier that allows other wireless communication devices (e.g., client stations that are associated with the AP 114) to determine whether the PPDU 300 is transmitted in a BSS to which the device that transmits the PPDU 300 belongs ("self BSS") or some other BSS (e.g., an overlapping BSS (OBSS)), in an embodiment. The other wireless communication device utilizes the BSS color identifier to determine spatial reuse parameters based on the PPDU 300, in an embodiment. In an embodiment, when the AP 114 utilizes the PHY format of the PPDU 300 to transmit a management frame such as a beacon frame, the AP 114 sets the BSS color identifier to a predetermined value (e.g., zero or other suitable predetermined value). In another embodiment, when the AP 114 utilizes the PHY format of the PPDU 300 to transmit a management frame such as a beacon frame, the AP 114 optionally sets the BSS color identifier to either a BSS color of the AP 114 or a predetermined value (e.g., zero or other suitable predetermined value). The predetermined value of the BSS color identifier in the PPDU 300 that includes a management frame (e.g., a beacon frame) indicates to client stations that spatial reuse is disallowed during transmission of the PPDU 300 that includes the management frame, in an embodiment. Setting the BSS color identifier of the PPDU 300 that includes a management frame (e.g., a beacon frame) to the predetermined value allows client stations that are not associated with the AP 114 to more quickly decode the PPDU 300 that includes the management frame (e.g., decode less of the PPDU 300 that includes the management frame), in an embodiment. In an embodiment in which setting the BSS color identifier of the PPDU 300 that includes a management frame is optional, the AP 114 sets the BSS color identifier of the PPDU 300 that includes a management frame to the predetermined value when the AP 114 to allow client stations that are not associated with the AP 114 to discover and associate with the AP 114 and sets the BSS color identifier of the PPDU 300 that includes the management frame to the value of the BSS color of the AP 114 when the AP 114 does not wish client stations that are not associated with the AP 114 to discover and associated with the AP 114, in an embodiment.

Figure 4:
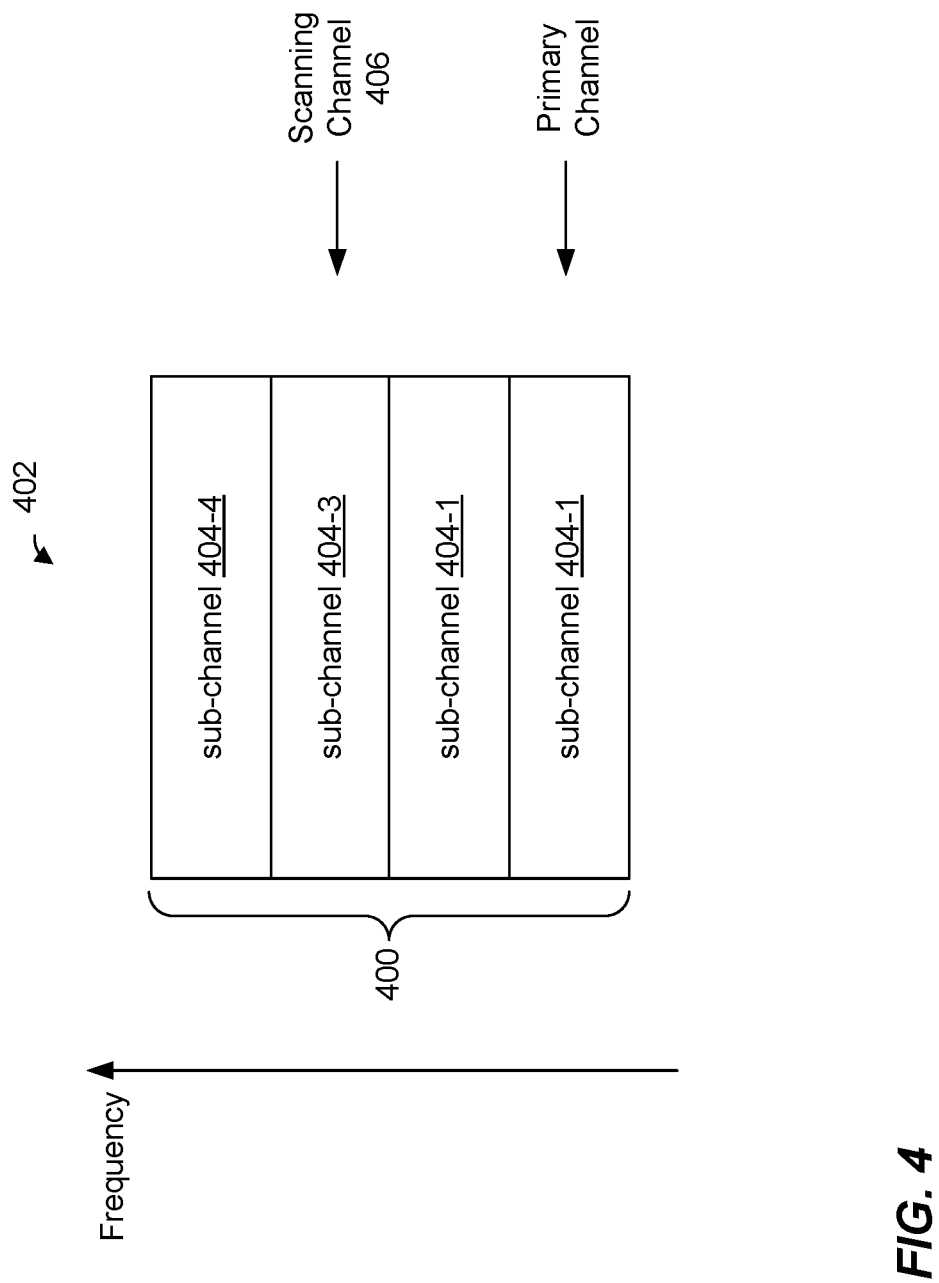
FIG. 4 is a diagram of an example operating channel utilized for operation of the WLAN of FIG. 1, according to an embodiment.

FIG. 4 is a diagram of an example operating channel 400 of a BSS 402 managed by the AP 114, in an embodiment. In an embodiment, the BSS 402 operates in the first frequency band. In another embodiment, the BSS 402 operates in the second frequency band or in the third frequency band. The operating channel 400 is a composite channel that comprises a plurality of component channels 404. In some embodiments, at least one component channel (e.g., component channel 404-1) in the operating channel 400 is designated as a primary channel of the BSS 402 managed by the AP 114, and other component channels (e.g., component channels 404-2, 404-3, 404-4) are designated as secondary channels of the BSS 402 managed by the AP 114.

In an embodiment, a component channel of the operating channel 400 corresponds to a scanning channel 406 specified by the first communication protocol. The component channel that corresponds to the scanning channel 406 is a secondary component channel (e.g., the component channel 404-3) as illustrated in FIG. 4, or corresponds to a primary component channel (e.g., the component channel 404-1), in various embodiments. In an embodiment in which the scanning channel 406 corresponds to a secondary component channel of the BSS 402, the AP 114 is configured to transmit (e.g., broadcast or multicast to client stations 154) a management frame (e.g., a beacon frame) that includes information indicating capabilities of the AP 114 and/or network management parameters associated with the BSS 402 managed by the AP 114 in a duplicate PHY mode in which duplicates of the management frame are simultaneously transmitted in at least in the primary component channel 400 of the BSS 402 and the secondary component channel of the operating channel 400 of the BSS 402 that corresponds to the scanning channel 406 specified by the first communication protocol. In an embodiment, transmission of a first duplicate of the management frame in the primary component channel of the operating channel 400 of the BSS 402 allows client stations that are associated with the AP 114 and are currently operating in the BSS 402 managed by the AP 114 to synchronize with the AP 114 and to obtain information indicating current operating parameters of the BSS 402. Simultaneous transmission of a second duplicate of the management frame in the scanning channel 406 that corresponds to the secondary component channel of the operating channel 400 of the BSS 402 allows client stations that are not associated with the AP 114 to discover the BSS 402 managed by the AP 114 and to determine whether or not to join the BSS 402 managed by the AP 114, in an embodiment.

In an embodiment, the client station 154-1 is configured to scan through scanning channels specified by the first communication protocol, dwelling in each scanning channel long enough in an attempt to receive a beacon frame in the scanning channel, or transmitting a probe request frame in the scanning channel and waiting in an attempt to receive a probe response frame in the scanning channel. If the client station 154-1 receives a beacon frame or a probe response frame in a scanning channel (e.g., the scanning channel 406) from the AP 114, the client station 154-1 obtains, from the beacon frame or the probe response frame, information indicating parameters of the BSS managed by the AP 114, such as one or more of i) an indication of the primary component channel of the BSS, ii) maximum transmit power permitted in the BSS, ii) an indication of whether or not active scanning is permitted in the BSS, iv) an identifier (e.g., service set identifier (SSID)) associated with the BSS, v) security parameters of the BSS, etc. The client station 154-1 determines whether or not to join the BSS based at least in part on the parameters of the BSS indicated in the beacon frame or the probe response frame, in an embodiment, Subsequently, if the client station 154-1 decides to join the BSS, the client station 154-1 utilizes the primary component channel indicated in the to associate with the AP 114. For example, the client station 154-1 switches to the primary component channel (e.g., the component channel 404-1) indicated in the beacon frame or the probe response frame to associate with the AP 114.

FIG. 5 is a diagram of an example capabilities element 500 for advertising capabilities of a communication device (e.g., an AP or a client station) in a WLAN, according to an embodiment. The capabilities element 500 is an "HE capabilities element," according to an embodiment. FIG. 5 indicates example lengths of various fields of the capabilities element 500, according to an embodiment. In other embodiments, fields of the capabilities element 500 have other suitable lengths. Additionally, in other embodiments, the capabilities element 500 includes suitable fields other than those shown in FIG. 5, and/or omits one or more of the fields shown in FIG. 5.

The AP 114 (e.g., the MAC processor 130) includes the capabilities element 500 in management frames (e.g., MAC management frames) such as a beacon frame, a probe response frame, an association response frame, a reassociation response frame, etc., for transmission to other wireless communication devices (e.g., the client stations 154) to advertise to the other wireless communication devices the capabilities of the AP 114, according to an embodiment. Upon receiving the capabilities element 500, the client station 154-1 (e.g., the MAC processor 170) uses the information regarding the capabilities of the AP 114 included in the capabilities element 500 to determine whether or not to associate with the AP 114, for example, according to an embodiment.

The client station 154-1 (e.g., the MAC processor 170) includes the capabilities element 500 in management frames (e.g., MAC management frames) such as a probe request frame, an association request frame, a request response frame, etc., for transmission to the AP 114 to advertise to the AP 114 the capabilities of the client station 154-1, according to an embodiment. Upon receiving the capabilities element 500, the AP 114 (e.g., the MAC processor 130) uses the information regarding the capabilities of the client station 154-1 included in the capabilities element 500 to determine whether or not to associate with the client station 154-1, for example, according to an embodiment.

The capabilities element 500 includes an element identifier (ID) field 504, a Length field 508, an Element ID Extension field 512, an HE MAC Capabilities Information field 516, an HE PHY Capabilities Information field 520, a Supported MCS and NSS set field 524 and an optional PPE threshold field 528. In an embodiment, the HE PHY Capabilities Information field 520 includes a channel width subfield set to indicate the bandwidth supported by the communication device that transmits the capabilities element 500. In an embodiment, the first communication protocol requires that the bandwidth supported by the communication device in the first frequency band (e.g., the 6 GHz band) is the same as the bandwidth supported by the communication device is the second frequency band (e.g., the 5 GHz band), and the channel width subfield in the HE PHY Capabilities Information field 520 indicates the bandwidth supported by the communication device in both the first frequency band and the second frequency band. In another embodiment, the HE PHY Capabilities Information field 520 includes respective subfields for indicating respective bandwidths supported by the communication device in the first frequency band and in the second frequency. For example, the first communication protocol allows supported bandwidth in the first frequency band to be different from the supported bandwidth in the second frequency band, and the HE PHY Capabilities Information field 520 includes respective channel width subfields independently set to respectively indicate a first bandwidth supported in the first frequency band and a second bandwidth supported in the second frequency band.

FIG. 6 is a diagram of a PHY capabilities information field 600 for conveying PHY capabilities of a communication device (e.g., the AP 114 or a client station 154) in a WLAN, according to an embodiment. The PHY capabilities information field 600 corresponds to the HE PHY capabilities information field 520 of the capabilities element 500 of FIG. 5, in an embodiment. In other embodiments, the PHY capabilities information field 600 is included in elements different from the capabilities element 500 of FIG. 5. FIG. 6 indicates example lengths of various fields of the PHY capabilities information field 600, according to an embodiment. In other embodiments, fields of the PHY capabilities information field 600 have other suitable lengths. Additionally, in other embodiments, the PHY capabilities information field 600 includes suitable fields other than those shown in FIG. 6, and/or omits one or more of the fields shown in FIG. 6.

The PHY capabilities information field 600 includes a plurality of subfields including a channel width set subfield 604 and a frequency band support (e.g., 5G/6G support) subfield 608. The channel width set subfield 604 includes one or more bits set to indicate a bandwidth supported by the communication device that transmits PHY capabilities information field 600. In an embodiment, a first value of the one or more bits of the channel width set subfield 604 indicates that 20 MHz bandwidth is supported by the communication device in one or both of the first frequency band and the second frequency band, a second value of the one or more bits of the channel width set subfield 604 indicates that 40 MHz bandwidth is supported by the communication device in one or both of the first frequency band and the second frequency band, a third value of the one or more bits of the channel width set subfield 604 indicates that 80 MHz bandwidth is supported by the communication device in one or both of the first frequency band and the second frequency band, a fourth value of the one or more bits of the channel width set subfield 604 indicates that 160 MHz (contiguous in frequency) and 80+80 MHz (e.g., two 80 MHz segments separated by a gap in frequency) bandwidth is supported by the communication device in one or both of the first frequency band and the second frequency band.

The frequency band support subfield 608 is set to indicate whether one or both of the first frequency band and second frequency band are supported by the communication device that transmits PHY capabilities information field 600, in an embodiment. In an embodiment, the frequency band support subfield 608 comprises two bits set to i) a first value (e.g., 00) to indicate that neither the first frequency band nor the second frequency band is supported ii) a second value (e.g., 01) to indicate that the first frequency band is not supported and the second frequency band is supported, iii) a third value (e.g., 10) to indicate that first frequency band is supported and the second frequency band is not supported, or iv) a fourth value (e.g., 11) to indicate that the first frequency band and the second frequency band are supported. In another embodiment, support for the first frequency band and the second frequency band is indicated implicitly or is indicated in a manner other than by a subfield of the PHY capabilities information field 600. When support for the first frequency band and the second frequency band is indicated implicitly or is indicated by in a manner other than by a subfield of the PHY capabilities information field 600, the frequency band support subfield 608 is reserved, omitted, or used for indicating parameters other than frequency band support, in various embodiments.

In an embodiment, interpretation of the channel width set 604 depends on the indication of the frequency band support in the frequency band support subfield 608. For example, when the frequency band support subfield 608 is set to indicate that the first frequency band is supported and the second frequency band is not supported, then a communication that receives the PHY capabilities information field 600 interprets the bandwidth indicated in the frequency band support subfield 608 to indicate bandwidth support in the first frequency band. Similarly, when the frequency band support subfield 608 is set to indicate that the first frequency band is not supported and the second frequency band is supported, then a communication that receives the PHY capabilities information field 600 interprets the bandwidth indicated in the frequency band support subfield 608 to indicate bandwidth support in the second frequency band. When the band support subfield 608 is set to indicate that the both first frequency band and the second frequency band are supported, then a communication that receives the PHY capabilities information field 600 interprets the bandwidth indicated in the frequency band support subfield 608 to indicate bandwidth support in both the first frequency band and the second frequency band, in an embodiment.

Figure 7:
FIG. 7 is a diagram of another PHY capabilities information field of a capabilities element for advertising capabilities of a communication device in the WLAN of FIG. 1, according to another embodiment.

FIG. 7 is a diagram of another PHY capabilities information field 700 for conveying PHY capabilities of a communication device (e.g., the AP 114 or a client station 154) in a WLAN, according to an embodiment. The PHY capabilities information field 700 corresponds to the HE PHY capabilities information field 520 of the capabilities element 500 of FIG. 5, in an embodiment. In other embodiments, the PHY capabilities information field 700 is included in elements different from the capabilities element 500 of FIG. 5. FIG. 7 indicates example lengths of various fields of the PHY capabilities information field 700, according to an embodiment. In other embodiments, fields of the PHY capabilities information field 700 have other suitable lengths. Additionally, in other embodiments, the PHY capabilities information field 700 includes suitable fields other than those shown in FIG. 7, and/or omits one or more of the fields shown in FIG. 7.

The PHY capabilities information field 700 includes a plurality of subfields including a channel width set subfield 704 and a first frequency band bandwidth support (e.g., 6 GHz bandwidth support) subfield 708. The channel width set subfield 704 and the first frequency band bandwidth support subfield 708 include respective sets of one or more bits set to indicate respective bandwidths supported in the first frequency band and in the second frequency band supported by the communication device that transmits the information field 700, in an embodiment.

The channel width set subfield 704 includes one or more bits set to indicate a first bandwidth supported in the second frequency band by the communication device that transmits PHY capabilities information field 700, in an embodiment. The one or more bits in the channel width set subfield 704 are set to indicate a first bandwidth supported by the communication device in the second frequency band, in an embodiment. In an embodiment, a first value of the one or more bits of the channel width set subfield 704 indicates that 20 MHz bandwidth is supported by the communication device in the second frequency band, a second value of the one or more bits of the channel width set subfield 704 indicates that 40 MHz bandwidth is supported by the communication device in the second frequency band, a third value of the one or more bits of the channel width set subfield 704 indicates that 80 MHz bandwidth is supported by the communication device in the second frequency band, a fourth value of the one or more bits of the channel width set subfield 704 indicates that 160 MHz (contiguous in frequency) and 80+80 MHz (e.g., two 80 MHz segments separated by a gap in frequency) bandwidth is supported by the communication device in the second frequency band.

The first frequency band bandwidth support subfield 708 includes one or more bits set to indicate a bandwidth supported in the first frequency band by the first frequency band bandwidth support subfield 708 communication device that transmits PHY capabilities information field 700. In an embodiment, the first frequency band bandwidth support subfield 708 comprises three bits. In another embodiment, the first frequency band bandwidth support subfield 708 comprises a suitable number of bits different than three bits.

The one or more bits in first frequency band bandwidth support 708 are set to indicate a second bandwidth supported by the communication device in the first frequency band, in an embodiment. In an embodiment, a first value of the one or more bits of the first frequency band bandwidth support subfield 708 indicates that 20 MHz bandwidth is supported by the communication device in the first frequency band, a second value of the one or more bits of the first frequency band bandwidth support subfield 708 indicates that 40 MHz bandwidth is supported by the communication device in the first frequency band, a third value of the one or more bits of the first frequency band bandwidth support subfield 708 indicates that 80 MHz bandwidth is supported by the communication device in the first frequency band, a fourth value of the one or more bits of the first frequency band bandwidth support subfield 708 indicates that 160 MHz (contiguous in frequency) and 80+80 MHz (e.g., two 80 MHz segments separated by a gap in frequency) bandwidth is supported by the communication device in the first frequency band.

FIGS. 8A-8C are diagrams of capabilities elements 800, 820, 850 for conveying capabilities of a communication device (e.g., the AP 114 or a client station 154) in a WLAN, according to an embodiment. The capabilities element 800 of FIG. 8A is an "HT capabilities element," where HT stands for high throughput, according to an embodiment. The capabilities element 820 of FIG. 8A is an "VHT capabilities element," where VHT stands for very high throughput, according to an embodiment. The capabilities element 850 of FIG. 8C is an "HE capabilities element," where HE stands for high efficiency, according to an embodiment.

FIGS. 8A-C indicate example lengths of various fields of the capabilities elements 800, 820, 850, according to an embodiment. In other embodiments, fields of the capabilities elements 800, 820, 850 have other suitable lengths. Additionally, in other embodiments, the capabilities elements 800, 820, 850 include suitable fields other than those shown in FIGS. 8A-C, and/or omit one or more of the fields shown in FIG. 8A-C.

The AP 114 (e.g., the MAC processor 130) includes one or more of the capabilities elements 800, 820, 850 in management frames (e.g., MAC management frames) such as a beacon frame, a probe response frame, an association response frame, a reassociation response frame, etc., to be transmitted to other wireless communication devices (e.g., client stations 154) to advertise to the other wireless communication devices capabilities of the AP 114 for operation in the second frequency band and/or in the third frequency band, according to an embodiment. Upon receiving the one or more of the capabilities elements 800, 820, 850, the client station 154-1 (e.g., the MAC processor 170) uses the information regarding the capabilities of the AP 114 included in the one or more of the capabilities elements 800, 820, 850 to determine whether or not to associate with the AP 114, for example, according to an embodiment.

The client station 154-1 (e.g., the MAC processor 170) includes the one or more of the capabilities elements 800, 820, 850 in management frames (e.g., MAC management frames) such as a probe request frame, an association request frame, a request response frame, etc., to be transmitted transmission to the AP 114 to advertise to the AP 114 capabilities of the client station 154-1 for operation in the first frequency band, the second frequency band and/or the third frequency band, according to an embodiment. Upon receiving the one or more of the capabilities elements 800, 820, 850, the AP 114 (e.g., the MAC processor 130) uses the information regarding the capabilities of the client station 154-1 included in the one or more of the capabilities elements 800, 820, 850 to determine whether or not to associate with the client station 154-1, for example, according to an embodiment.

The capabilities element 800 of FIG. 8A includes an element identifier (ID) field 802, a Length field 804, an HT Capability Information field 806, an A-MPDU Parameters field 808, a Supported MCS set field 810, an HT Extended Capabilities field 812, a Transmit Beamforming Capabilities field 814 and an ASEL capabilities field 816, in an embodiment. The capabilities element 820 of FIG. 8B includes an element identifier (ID) field 822, a Length field 824, a VHT Capability Information field 826 and a Supported VHT-MCS and Nss set field 828, in an embodiment. The capabilities element 850 of FIG. 8C includes an A-MPDU parameters field 852 and a maximum MPDU length field 854, in an embodiment.

In an embodiment, when the capabilities element 800 and the capabilities element 820 are included in management frames (e.g., MAC management frames) such as a probe request frame, an association request frame, a request response frame, etc., for transmission in the first frequency band, at least portions of one or more of the fields 802-816 and 822-828 of the capabilities elements 800, 820 are used for indicating parameters for operation in the first frequency band and the remaining bits of the fields 802-816 and 822-828 are reserved to are omitted. For example, i) the A-MPDU Parameters field 808 capabilities element 800 is set to indicate A-MPDU parameters for operation in the first frequency band and ii) a maximum MPDU length subfield of the VHT capabilities information field 826 of the capabilities element 820 is used to indicate a maximum MPDU length supported in the first frequency band, and the remaining bits of the fields 802-816 and 822-828 are reserved or omitted, in an embodiment. As another example, i) the A-MPDU Parameters field 808 is set to indicate A-MPDU parameters for operation in the first frequency band, ii) the supported MCS set field 810 is set to indicate modulation and coding schemes supported for operation in the first frequency band and iii) a maximum MPDU length subfield of the VHT capabilities information field 826 of the capabilities element 820 is used to indicate a maximum MPDU length supported in the first frequency band, and the remaining bits of the fields 802-816 and 822-828 are reserved or omitted.

In yet another embodiment, the capabilities elements 800, 820 are entirely omitted from management frames (e.g., MAC management frames) such as a probe request frame, an association request frame, a request response frame, etc., for transmission in the first frequency band. For example, the first communication protocol specifies that the HT capabilities element 800 and the VHT capabilities element 820 are not transmitted in the first frequency band, according to an embodiment. Instead, the first communication protocol specifies that the capabilities element 850 (e.g., HE capabilities element) is transmitted in the first frequency band, in an embodiment. For example, the A-MPDU Parameters field 852 of the capabilities element 850 is set to indicate A-MPDU parameters for operation in the first frequency band and ii) the maximum MPDU length field 854 of the capabilities element 850 is used to indicate a maximum MPDU length supported in the first frequency band, in an embodiment.

Figure 9:
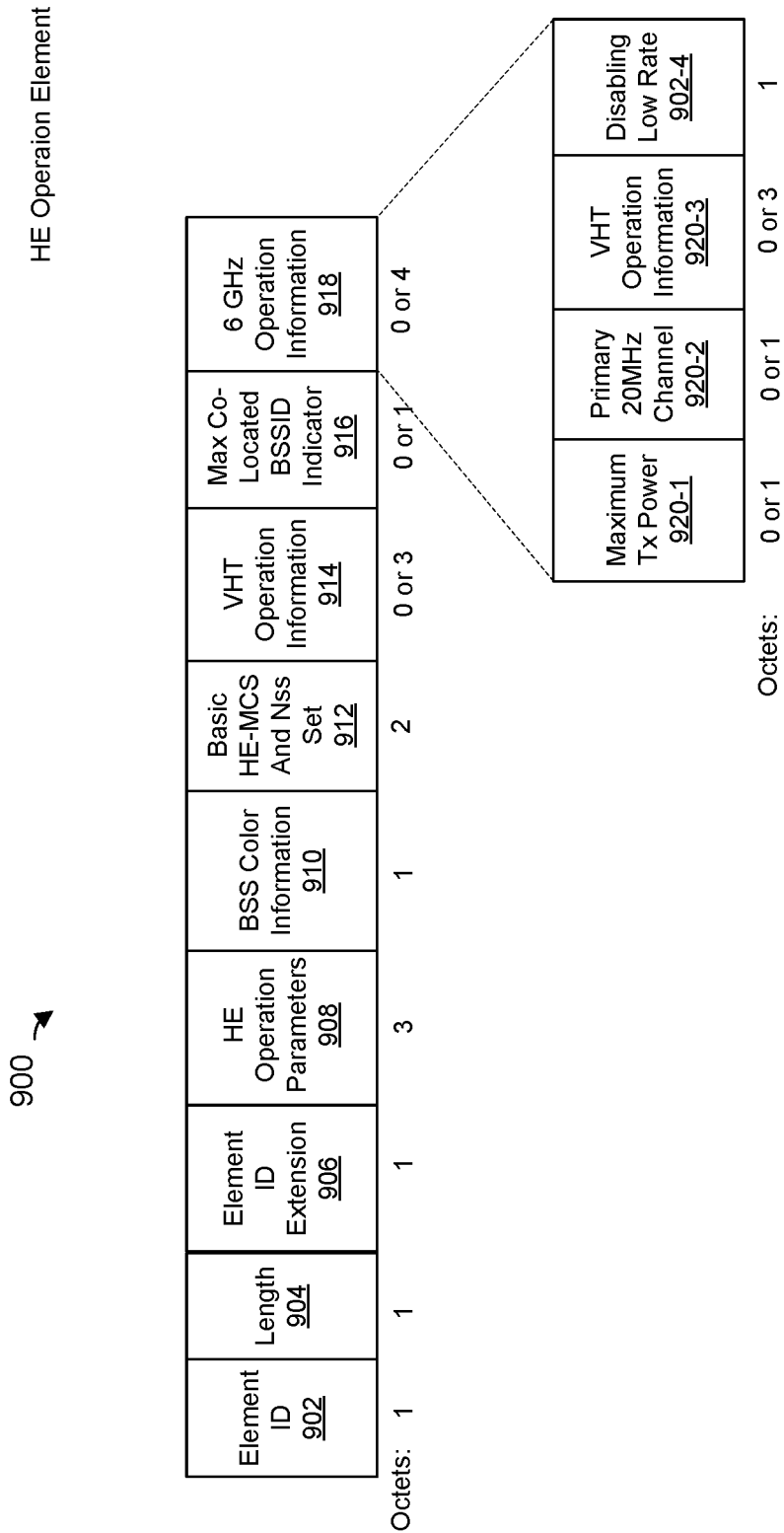
FIG. 9 is a diagram of an operation element for conveying operation parameters of the WLAN of FIG. 1, according to an embodiment.

FIG. 9 is a diagram of an operation element 900 for conveying operation parameters of a WLAN, according to an embodiment. The operation element 900 is an "HE operation element," according to an embodiment. FIG. 9 indicates example lengths of various fields of the operation element 900, according to an embodiment. In other embodiments, fields of the operation element 900 have other suitable lengths. Additionally, in other embodiments, the operation element 900 includes suitable fields other than those shown in FIG. 9, and/or omits one or more of the fields shown in FIG. 9.

The AP 114 (e.g., the MAC processor 130) includes the operation element 900 in management frames (e.g., MAC management frames) such as a beacon frame, a probe response frame, an association response frame, a reassociation response frame, etc., for transmission to other wireless communication devices (e.g., the client stations 154) in the first frequency to inform the other wireless communication devices of operation parameters of a BSS managed by the AP 114, according to an embodiment. Upon receiving the operation element 900, the client station 154-1 (e.g., the MAC processor 170) uses the information regarding operating parameters included in the operation element 900 to set up proper operation in the BSS, for example, according to an embodiment.

The operation element 900 includes an element identifier (ID) field 902, a Length field 904, an Element ID Extension field 906, an HE operation parameters field 908, a BSS color information field 910, a basic HE-MCS and N$_{SS}$ set field 912, a VHT operation information field 914, a MAX Co-located BSS identifier (BSSID) indicator field 916 and a first frequency band operation information field (e.g., 6 GHz operation information field) 918, in an embodiment. The first frequency band operation information field 918 includes a plurality of subfields 920 including a maximum Tx power subfield 920-1, a primary channel subfield (e.g., primary 20 MHz subfield) 920-2, a VHT operation information subfield 920-3 and a disabling low rate subfield 920-4. In some embodiments, the first frequency band operation information field 918 excludes one or more subfields 920 illustrated in FIG. 9 and/or includes one or more additional subfield 920 not illustrated in FIG. 9.

The maximum Tx power subfield 920-1 is set to indicate the maximum transmit power permitted for transmission of a PPDU by a client station in the BSS that operates in the first frequency band, in an embodiment. In an embodiment, the maximum Tx power subfield 920-1 is set to indicate maximum transmit power selected from a set of powers in the range of −20 dBm to 40 dBm in 1 dB increments. In other embodiments, the maximum Tx power subfield 920-1 is set to indicate other suitable maximum transmit power values. The primary channel subfield 902-2 is set to indicate the location of the primary component channel of the BSS in the first frequency band, in an embodiment. For example, the primary channel subfield 902-2 is set to indicate the channel number or the channel center frequency of the primary component channel of the BSS in the first frequency band, in an embodiment.

The VHT operation information subfield 920-3 is set to indicate the bandwidth of an operating channel of the BSS in the first frequency band and/or locations of one or more channel segments of the operating channel of the BSS in the first frequency band. In another embodiment, the VHT operation information subfield 920-3 is reserved or omitted. For example, in an embodiment, the AP 114 (e.g., the MAC processor 130) indicates, in an information element (e.g., a VHT information element) separate from the operation element 900, a bandwidth and/or locations of one or more channel segments of an operating channel in the second frequency band, where the bandwidth and/or locations of one or more channel segments of the operating channel in the second frequency band also applies to the BSS in the first frequency band, in an embodiment.

In an embodiment, the first frequency band operation information field 918 in the operation element 900 is optional. For example, in an embodiment, the first frequency band operation information field 918 is included in the operation information field 918 when the BSS of which operating parameters are being conveyed by the operation element 900 is in the first frequency band and is omitted from the operation element 900 when the BSS of which operating parameters are being conveyed by the operation element 900 is in the second frequency band or in the third frequency band. In an embodiment in which the first frequency band operation information field 918 is optional, another field of the operation element 900 includes information indicating whether or not the first frequency band operation information field 918 is included in the operation element 900. For example, the HE operation parameters field 908 or another suitable field of the operation element 900 includes information indicating whether or not the first frequency band operation information field 918 is included in the operation element 900, in various embodiments.

The disabling low rate subfield 902-4 includes information indicating a lowest data rate that is allowed for transmission in the BSS. The lowest data rate that is allowed in the BSS is higher than the lowest data rate specified by the first communication protocol in at least some situations, in an embodiment. Allowing a lowest data rate for transmission in the BSS that is higher than the lowest data rate specified by the first communication protocol results in a higher throughput in the BSS as compared to systems in which the lowest data rate specified by the first communication protocol is allowed in the BSS.

FIG. 10A is a diagram of a disallowed lowest rate subfield 1000, according to an embodiment. In an embodiment, the disallowed lowest rate subfield 1000 corresponds to the disabling low rate subfield 1002-4 of FIG. 10. In an embodiment, the disallowed lowest rate subfield 1000 includes two octets of bits. In another embodiment, the disallowed lowest rate subfield 1000 includes a suitable number of bits different from two octets of bits. The disallowed lowest rate subfield 1000 is set to indicate the lowest data rate that is allowed in the BSS, in an embodiment. In an embodiment, the disallowed lowest rate subfield 1000 is set to indicate the lowest data rate in increments of 512 kilo-bits per second (kbps) or other suitable increments. In an embodiment, the lowest data rate indicated in the disallowed lowest rate subfield 1000 signifies to client stations that combination of modulation and coding scheme(s) (MCS(s)) and numbers of spatial streams ($N_{SS}$) that result in data rate(s) lower than the lowest data rate indicated in the disallowed lowest rate subfield 1000 cannot be utilized.

FIG. 10B is a block diagram of another disallowed lowest rate subfield 1050, according to another embodiment. In an embodiment, the disallowed lowest rate subfield 1050 corresponds to the disabling low rate subfield 1002-4 of FIG. 10. The disallowed lowest rate subfield 1050, itself, includes a plurality of subfields 1052. In some embodiments, the disallowed lowest rate subfield 1050 omits one or more of the subfields 1052 illustrated in FIG. 10B and/or includes one or more subfields not illustrated in FIG. 10B. In an embodiment, respective ones of the subfields 1052 are set to indicate respective lowest MCSs allowed with respective numbers of spatial streams and respective channel bandwidths, in an embodiment. In an embodiment, each subfield 1052 comprises two bits. In other embodiments, at least some of the subfields 1052 comprise suitable numbers of bits different from two bits. In an embodiment, the plurality of subfields 1052 includes a first subfield 1052-1 set to indicate the lowest MCS allowed to be used with one spatial stream in a 20 MHz-wide or a 40 MHz-wide channel, a second subfield 1052-2 set to indicate the lowest MCS allowed to be used with two spatial streams in a 20 MHz-wide or a 40 MHz-wide channel, a third subfield 1052-3 set to indicate the lowest MCS allowed to be used with three spatial streams in a 20 MHz-wide or a 40 MHz-wide channel, and a fourth subfield 1052-4 set to indicate the lowest MCS allowed to be used with four spatial streams in a 20 MHz-wide or a 40 MHz-wide channel. The plurality of subfields 1052 additionally includes a fifth subfield 1052-5 set to indicate the lowest MCS allowed to be used with one spatial stream in an 80 MHz-wide or a 160 MHz-wide or an 80+80 MHz-wide channel, a sixth subfield 1052-6 set to indicate the lowest MCS allowed to be used with two spatial streams in an 80 MHz-wide or a 160 MHz-wide or an 80+80 MHz-wide channel, a seventh subfield 1052-7 set to indicate the lowest MCS allowed to be used with three spatial streams in an 80 MHz-wide or a 160 MHz-wide or an 80+80 MHz-wide channel, and an eighth subfield 1052-5 set to indicate the lowest MCS allowed to be used with four spatial streams in an 80 MHz-wide or a 160 MHz-wide or an 80+80 MHz-wide channel. In some embodiments, the plurality of subfields 1052 additionally or alternatively includes subfields set to indicate the lowest MCSs allowed to be used with other suitable numbers of spatial streams and/or in other suitable channel bandwidths.

In various embodiments, a communication device (e.g., the AP 114) operating in a WLAN announces support for operation in the first frequency band by including indication of support in a management frame (e.g., a beacon frame, a prone response frame etc.) that the communication transmits in a frequency band other than the first frequency band, such as in the second frequency band and/or the third frequency band. In another embodiment, a communication device (e.g., the AP 114) operating in a WLAN announces support for operation in the first frequency band by including indication of support in a management frame (e.g., a beacon frame, a prone response frame, a fast initial link setup (FILS) frame, etc.) that the communication transmits in the first frequency band.

FIG. 11 is a diagram of a multi-band element 1100 for conveying frequency bands parameters of a communication device in a WLAN, according to an embodiment. In an embodiment, a communication device (e.g., the AP 114 or the client station 154-1) includes the multi-band element 1000 in a management frame that the communication device transmits in one or more of the first frequency band, the second frequency band and the third frequency band. FIG. 11 indicates example lengths of various fields of the multi-band element 1100, according to an embodiment. In other embodiments, fields of the multi-band element 1100 have other suitable lengths. Additionally, in other embodiments, the multi-band element 1100 includes suitable fields other than those shown in FIG. 11, and/or omits one or more of the fields shown in FIG. 11.

The plurality of fields of the multi-band element 1100 includes a band ID field 1102, in an embodiment. The band ID field 1102 is set to indicate a frequency band supported by the communication device that transmits the multi-band element 1100 is operating. FIG. 12 is a table 1200 listing example values and corresponding interpretations of the band ID field 1102, according to an embodiment. Referring to FIG. 12, in an embodiment, the communication device sets the band ID field 1102 to a value selected from a plurality of values in the range of zero to six to indicate the frequency band supported by the communication device. For example, the communication device sets the band ID field 1102 to the value of zero to indicate that the communication device supports operation in TV white space, sets the band ID field 1102 to the value of one to indicate that the communication device supports operation in the sub-1 GHz space excluding the TV white space, sets the band ID field 1102 to the value of two to indicate that the communication device supports operation in 2.4 GHz band, etc., in various embodiments. In an embodiment, sets the band ID field 1102 to the value of six to indicate that the communication device supports operation in the first frequency band (e.g., the 6 GHz band). Other values of the band ID field 1102 are used to indicate that the communication device supports operation in the first frequency band, in other embodiments.

In an embodiment, the AP 114 and a client station 154 (e.g., the client station 154-1 each supports multi-band operation (e.g., dual-band operation) in a first frequency band (e.g., the 6 GHz) band and one or more other frequency bands, such as one or both of the second frequency band and the third frequency band. In some embodiments, when a client station 154 configured for multi-band operation associates with the AP 114 configured to multi-band operation, a traffic distribution scheme is utilized to distribute traffic between the first frequency band and the one or more other frequency bands. For example, according to the traffic distribution scheme, different types of traffic, such as traffic corresponding to different quality of service (QoS) levels, different access categories (ACs), etc., are transmitted in different ones of the frequency bands. In an embodiment, the AP 114 announces a traffic distribution policy, indicating the traffic distribution scheme, to the client station 154, where the same traffic distribution policy is defined for all client multi-band client stations operating on the WLAN 110, or where the traffic distribution policy is defined specifically for the client station 154. In another embodiment, the client station 154 requests (e.g., in an association request frame, reassociation request frame, etc.) a particular traffic distribution scheme, defining particular frequency bands for particular traffic types for transmissions between the AP 114 and the client station 154. Upon receiving a request from the client station 154, the AP 114 defines a traffic distribution scheme based on the requested traffic distribution scheme, and announces (e.g., in an association response frame, reassociation response frame, etc.) the defined traffic distribution scheme to the client station 154, in an embodiment.

Figure 13:
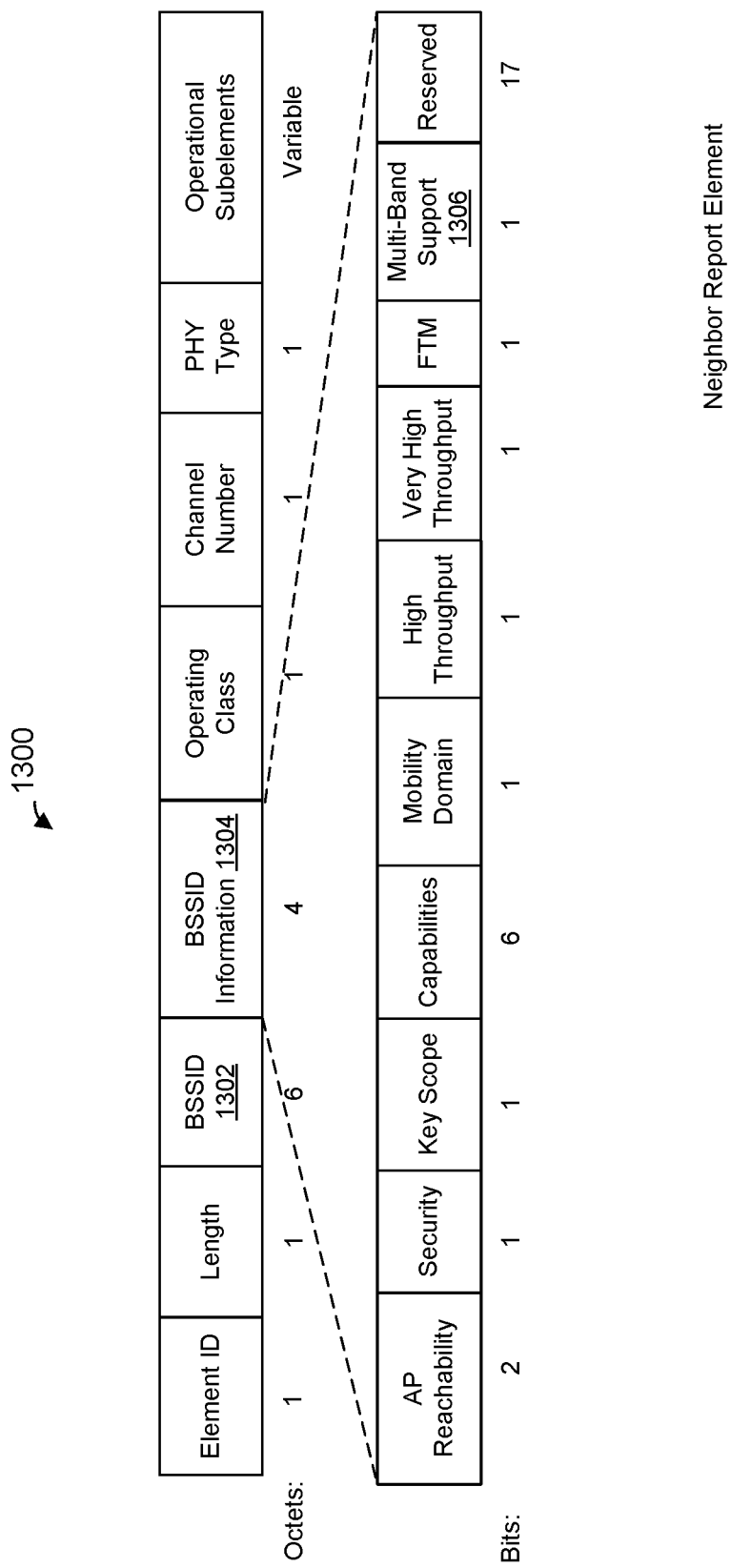
FIG. 13 is a diagram of a neighbor report element for conveying network parameters of neighbor access points (APs) and/or co-located APs in the WLAN of FIG. 1, according to an embodiment

FIG. 13 is a diagram of a neighbor report element 1300 for conveying network parameters of neighbor APs and/or co-located APs in a WLAN, according to an embodiment. In an embodiment, the AP 114 includes the neighbor report element 1300 in a management frame that the AP transmits in one or more of the first frequency band, the second frequency band and the third frequency band to indicate parameters of neighbor APs of the AP 114 and/or co-located APs with the AP 114. FIG. 13 indicates example lengths of various fields of the multi-band element 1100, according to an embodiment. In other embodiments, fields of neighbor report element 1300 have other suitable lengths. Additionally, in other embodiments, the neighbor report element 1300 includes suitable fields other than those shown in FIG. 13, and/or omits one or more of the fields shown in FIG. 13.

The plurality of fields of the neighbor report element 1300 includes a BSSID field 1302 and a BSSID information field 1304. The BSSID field 1302 is set to indicate a BSSID of the AP to which the neighbor report element 1300 corresponds, in an embodiment. The BSSID information field 1304 includes a plurality of subfields for indicating various network parameters of the AP associated with the BSSID indicated by the BSSID field 1302, in an embodiment. In an embodiment, the plurality of subfields of the BSSID information field 1304 includes a multi-band support subfield 1306. In an embodiment, the multi-band support subfield 1306 comprises one bit set to indicate wither or not the AP supports operation in the first frequency band (e.g., the 6 GHZ frequency band). In an embodiment, the BSSID information field 1304 optionally includes one or more subfields (no shown in FIG. 13) for indicating operating parameters in the first frequency band. For example, in an embodiment, the BSSID information field 1304 optionally includes a maximum power subfield set to indicate a maximum power the client stations are permitted to utilize in the first frequency band.

In an embodiment, the AP 114 transmits the neighbor report element 1300 in the second frequency band or in the third frequency band to indicate operation of the neighbor or co-located AP in the first frequency band. The client station 154-1 receives the neighbor report element 1300 in the second frequency band or in the third frequency band and determines, based on the indication in the multi-band support subfield 1306, that a neighbor or a co-located AP is operating in the first frequency band, in an embodiment. The client station 154-1 then switches to the first frequency band and performs active or passive scanning to discover the neighbor AP or the co-located AP in the first frequency band, in an embodiment. When the client station 154-1 utilizes active scanning to discover the neighbor AP or the co-located AP in the first frequency band, the client station 154-1 transmits a probe request frame in the first frequency band at a power level that does not exceed the maximum power level indicated in the BSSID information field 1304, according to an embodiment.

Figure 14:
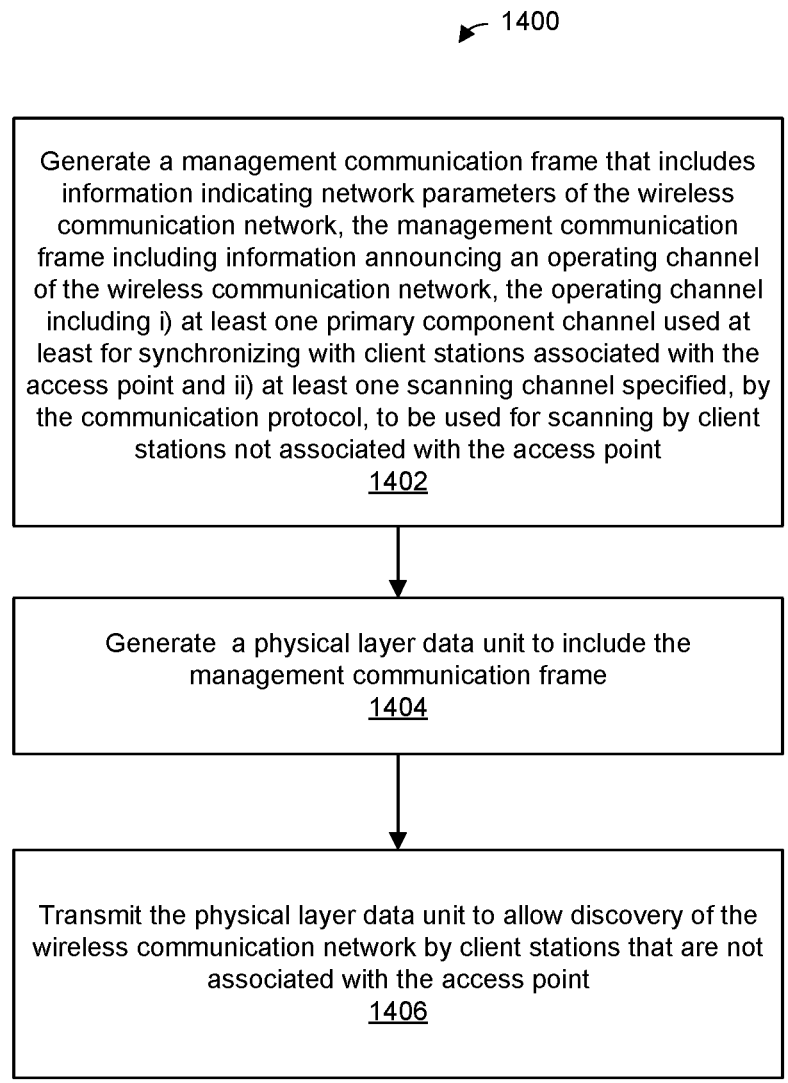
FIG. 14 is a flow diagram of a method, implemented in the WLAN of FIG. 1, for announcing presence of a wireless communication network managed by an access point configured for operating according to at least a first communication protocol, according to an embodiment.

FIG. 14 is a flow diagram of an example method 1400 for announcing presence of a wireless communication network managed by an access point configured for operating according to at least a first communication protocol, according to an embodiment. In some embodiments, the AP 114 of FIG. 1 is configured to implement the method 1400. The method 1400 is described, however, in the context of the AP 114 merely for explanatory purposes and, in other embodiments, the method 1400 is implemented by another suitable device such as the client station 154-1 or another suitable wireless communication device.

At block 1404, the AP 114 generates (e.g., the network interface device 122 generates, the MAC processor 126 generates, etc.) a management communication frame that includes information indicating network parameters of the wireless communication network. In various embodiments, the AP 114 generates a beacon frame, a probe response frame, etc. that includes information indicating network parameters of the wireless communication network. In an embodiment the AP 114 generates the management communication frame to include one or more of i) the capability element 500 of FIG. 5 ii) the operating element 900 of FIG. 9, iii) the multi-band element 1100 of FIG. 11, and iv) the neighbor report element 1300 of FIG. 13 to indicate network parameters of the wireless communication network. In other embodiments, the AP 114 generates the management communication frame to include the information indicating network parameters of the wireless communication network in other suitable manners. In an embodiment, the management communication frame including information announcing an operating channel of the wireless communication network, where the operating channel includes i) at least one primary component channel used at least for synchronizing with client stations associated with the access point and ii) at least one scanning channel specified, by the first communication protocol, to be used for scanning by client stations not associated with the access point. In an embodiment, the operating channel is the operating channel 400 of FIG. 4. In another embodiment, the operating channel is a suitable operating channel different from the operating channel.

At block 1404, the AP 114 generates (e.g., the network interface device 122 generates, the PHY processor 130 generates, etc.) a physical layer data unit to include the management communication frame. In an embodiment, the AP 114 generates the PPDU 200 of FIG. 2 to include the management communication frame (e.g., in the data portion 240). In another embodiment, the AP 114 generates the PPDU 300 of FIG. 3 to include the management communication frame (e.g., in the data portion 340). In other embodiments, the AP 114 generates suitable physical layer data units different from the PPDU 200 of FIG. 2 and the PPDU 300 of FIG. 3 to include the management communication frame.

At block 1406, the AP 114 (e.g., the network interface device 122, the PHY processor 130, etc.) transmits the physical layer data unit. In an embodiment, the AP 114 transmits the physical data unit in the at least one scanning channel, specified by the first communication protocol, to allow discovery of the wireless communication network by client stations that are not associated with the access point. In an embodiment, the at least one scanning channel corresponds to a secondary component channel of the operating channel of the wireless communication network. In another embodiment, the at least one scanning channel corresponds to a primary component channel of the operating channel of the wireless communication network. In an embodiment in which the at least one scanning channel corresponds to a secondary component channel of the operating channel of the wireless communication network, the AP 114 additionally transmits the physical data unit in the primary component channel of the operating channel of the wireless communication network. For example, the AP 114 transmits the physical layer data unit in a duplication mode in which duplicates of the physical data unit are simultaneously transmitted in the primary component channel of the operating channel of the wireless communication network and in the scanning channel that corresponds to the secondary component channel of the operating channel of the wireless communication network. Simultaneous transmission of the physical layer data unit in the primary component channel of the operating channel of the wireless communication network and in the scanning channel that corresponds to the secondary component channel of the operating channel of the wireless communication network allows the AP 114 to simultaneously allow i) client stations that are associated with the AP 114 to synchronize with the AP 114 and ii) client stations that are not associated with the AP 114 to discover presence of the wireless communication network managed by the AP 114, in an embodiment.

In various embodiments, a method comprises one of, or any suitable combination of two or more of, the following features.

Embodiment 1

A method for announcing presence of a wireless communication network managed by an access point configured for operating according to at least a first communication protocol includes: generating, at the access point, a management communication frame that includes information indicating network parameters of the wireless communication network, the management communication frame including information announcing an operating channel of the wireless communication network, the operating channel including i) at least one primary component channel used at least for synchronizing with client stations associated with the access point and ii) at least one scanning channel specified, by the first communication protocol, to be used for scanning by client stations not associated with the access point; generating, at the access point, a physical layer data unit to include the management communication frame; and transmitting, by the access point, the physical layer data unit to allow discovery of the wireless communication network by client stations that are not associated with the access point.

Embodiment 2

The method of embodiment 1, wherein the operating channel further includes one or more non-primary component channels different from the at least one primary component channel, and transmitting the physical layer data comprises transmitting the physical layer data unit in the at least one scanning channel that corresponds to a non-primary component channel among the one or more non-primary component channels.

Embodiment 3

The method of embodiments 1 or 2, wherein transmitting the physical layer data unit comprises simultaneously transmitting duplicates of the physical layer data unit in the primary component channel of the operating channel and in the scanning channel that corresponds to the non-primary component channel of the operating channel.

Embodiment 4

The method of any of embodiments 1-3, wherein generating the management communication frame comprises generating one of i) a beacon frame and ii) a probe response frame.

Embodiment 5

The method of any of embodiments 1-4, wherein generating the physical layer data unit comprises generating a non-legacy physical layer data unit that i) conforms to a PHY format specified by the first communication protocol and ii) does not conform to any PHY format specified by any other communication protocol that is legacy with respect to the first communication protocol.

Embodiment 6

The method of embodiment 5, wherein generating the physical layer data unit comprises generating the non-legacy physical layer data unit that conforms to one of i) a single user non-legacy physical layer data unit format specified by the first communication protocol and ii) an extended range single user non-legacy physical layer data unit format specified by the first communication protocol.

Embodiment 7

The method of embodiment 5, wherein generating the physical layer data unit comprises generating the non-legacy physical layer data unit that conforms to a multi-user non-legacy physical layer data unit format specified by the first communication protocol, and generating the non-legacy physical layer data unit that conforms to the multi-user non-legacy physical layer data unit format includes generating the non-legacy physical layer data unit such that the management communication frame is transmitted using one or more resource units of the multi-user non-legacy physical layer data unit format.

Embodiment 8

The method of any of embodiments 1-5, further comprising selecting, among i) a mandatory modulation and coding scheme (MCS) specified for the wireless communication network and ii) an MCS selected from a set of basic MCS specified fir the wireless communication networks, an MCS for transmission of the management frame, and transmitting, by the access point, the physical layer data unit includes transmitting the management frame using i) the selected MCS and ii) a single spatial stream ($N_{SS}$).

Embodiment 9

The method of any of embodiments 1-5, wherein the operating channel is in a first frequency band, and transmitting the management data unit comprises transmitting the management data unit in a second frequency band, different from the first frequency band, to allow discovery of the wireless communication network by client stations that are performing scanning in the second frequency band.

10

The method of any of embodiments 1-5, wherein generating the management communication frame comprises generating the management communication frame to conform to the first communication protocol and to include one or more of i) information indicating maximum power that client stations are permitted to utilize for a transmission in the first frequency band, ii) information indicating a lowest data rate permitted to be used for transmission in the first frequency band and iii) a non-legacy capabilities information element including information indicating parameters for transmission of medium access control (MAC) layer data units in the wireless communication network, wherein the management frame excludes legacy capabilities elements for announcement of the parameters for transmission of MAC layer data units in the wireless communication network.

Embodiment 11

An access point configured for operation according to at least a first communication protocol comprises a network interface device having one or more integrated circuit (IC) devices, wherein the one or more IC devices are configured to: generate a management communication frame that includes information indicating network parameters of the wireless communication network, the management communication frame including information announcing an operating channel of the wireless communication network, the operating channel including i) at least one primary component channel used at least for synchronizing with client stations associated with the access point and ii) at least one scanning channel specified, by the first communication protocol, to be used for scanning by client stations not associated with the access point, generate a physical layer data unit to include the management communication frame, and transmit the physical layer data unit to allow discovery of the wireless communication network by client stations that are not associated with the access point.

Embodiment 12

The access point of embodiment 11, wherein the operating channel further includes one or more non-primary component channels different from the at least one primary component channel, and the one or more IC devices are configured to transmit the physical layer data unit in the at least one scanning channel that corresponds to a non-primary component channel among the one or more non-primary component channels.

Embodiment 13

The access point of embodiment 12, wherein the one or more IC devices are configured to transmit duplicates of the physical layer data unit in the primary component channel of the operating channel and in the scanning channel that corresponds to the non-primary component channel of the operating channel.

Embodiment 14

The access point of any of embodiments 11-13, wherein the one or more IC devices are configured to generating the management communication frame at least by generating one of i) a beacon frame and ii) a probe response frame.

Embodiment 15

The access point of any of embodiments 11-14, wherein the one or more IC devices are configured to generate the physical layer data unit at least by generating a non-legacy physical layer data unit that i) conforms to a PHY format specified by the first communication protocol and ii) does not conform to any PHY format specified by any other communication protocol that is legacy with respect to the first communication protocol.

Embodiment 16

The access point of any of embodiment 15, wherein the one or more IC devices are configured to generate the non-legacy physical layer data unit to conform to one of i) a single user non-legacy physical layer data unit format specified by the first communication protocol and ii) an extended range single user non-legacy physical layer data unit format specified by the first communication protocol.

Embodiment 17

The access point of embodiment 15, wherein the one or more IC devices are configured to generate the non-legacy physical layer data unit to conform to a multi-user non-legacy physical layer data unit format specified by the first communication protocol, and generate the non-legacy physical layer data unit such that the management communication frame is transmitted using one or more resource units of the multi-user non-legacy physical layer data unit format.

Embodiment 18

The access point of any of embodiments 11-15, wherein the one or more IC devices are further configured to select, among i) a mandatory modulation and coding scheme (MCS) specified for the wireless communication network and ii) an MCS selected from a set of basic MCS specified fir the wireless communication networks, an MCS for transmission of the management frame, and transmit the physical layer data unit includes transmitting the management frame using i) the selected MCS and ii) a single spatial stream ($N_{SS}$).

Embodiment 19

The access point of any of embodiments 11-18, wherein the operating channel is in a first frequency band, and the one or more IC devices are configured to transmit the management data unit in a second frequency band, different from the first frequency band, to allow discovery of the wireless communication network by client stations that are performing scanning in the second frequency band.

Embodiment 20

The access point of embodiments 11-15, wherein the one or more IC devices are configured to generate the management communication frame to conform to the first communication protocol and to include one or more of i) information indicating maximum power that client stations are permitted to utilize for a transmission in the first frequency band, ii) information indicating a lowest data rate permitted to be used for transmission in the first frequency band and iii) a non-legacy capabilities information element including information indicating parameters for transmission of medium access control (MAC) layer data units in the wireless communication network, wherein the management frame excludes legacy capabilities elements for announcement of the parameters for transmission of MAC layer data units in the wireless communication network.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for announcing presence of a wireless communication network managed by an access point configured for operating according to at least a first communication protocol, the method comprising:
    generating, at the access point, a management communication frame that includes information indicating network parameters of the wireless communication network, wherein the management communication frame includes information announcing an operating channel of the wireless communication network and identifying at least one primary component channel within the operating channel, the operating channel including i) the at least one primary component channel used at least for transmitting management information for the wireless communication network to client stations already associated with the access point and ii) at least one scanning channel specified, by the first communication protocol, to be used for client stations not associated with the access point to discover the access point;
    generating, at the access point, a physical layer data unit to include the management communication frame; and
    transmitting, by the access point, the physical layer data unit in the at least one scanning channel to allow discovery of the wireless communication network by client stations that are not associated with the access point.

2. The method of claim 1, wherein
    the operating channel further includes one or more non-primary component channels different from the at least one primary component channel, and
    transmitting the physical layer data comprises transmitting the physical layer data unit in the at least one scanning channel that corresponds to a non-primary component channel among the one or more non-primary component channels.

3. The method of claim 2, wherein transmitting the physical layer data unit comprises simultaneously transmitting duplicates of the physical layer data unit in the primary component channel of the operating channel and in the scanning channel that corresponds to the non-primary component channel of the operating channel.

4. The method of claim 1, wherein generating the management communication frame comprises generating one of i) a beacon frame and ii) a probe response frame.

5. The method of claim 1, wherein generating the physical layer data unit comprises generating a non-legacy physical layer data unit that i) conforms to a PHY format specified by the first communication protocol and ii) does not conform to any PHY format specified by any other communication protocol that is legacy with respect to the first communication protocol.

6. The method of claim 5, wherein generating the physical layer data unit comprises generating the non-legacy physical layer data unit that conforms to one of i) a single user non-legacy physical layer data unit format specified by the first communication protocol and ii) an extended range single user non-legacy physical layer data unit format specified by the first communication protocol.

7. The method of claim 5, wherein generating the physical layer data unit comprises
    generating the non-legacy physical layer data unit that conforms to a multi-user non-legacy physical layer data unit format specified by the first communication protocol, and
    generating the non-legacy physical layer data unit that conforms to the multi-user non-legacy physical layer data unit format includes generating the non-legacy physical layer data unit such that the management communication frame is transmitted using one or more resource units of the multi-user non-legacy physical layer data unit format.

8. The method of claim 1, further comprising
    selecting, among i) a mandatory modulation and coding scheme (MCS) specified for the wireless communication network and ii) an MCS selected from a set of basic MCS specified fir for the wireless communication network, an MCS for transmission of the management frame, and
    transmitting, by the access point, the physical layer data unit includes transmitting the management frame using i) the selected MCS and ii) a single spatial stream.

9. The method of claim 1, wherein
    the operating channel is in a first frequency band, and
    transmitting the management data unit comprises transmitting the management data unit in a second frequency band, different from the first frequency band, to allow discovery of the wireless communication network by client stations that are performing scanning in the second frequency band.

10. The method of claim 1, wherein generating the management communication frame comprises generating the management communication frame to conform to the first communication protocol and to include one or more of i) information indicating maximum power that client stations are permitted to utilize for a transmission in the first frequency band, ii) information indicating a lowest data rate permitted to be used for transmission in the first frequency band and iii) a non-legacy capabilities information element including information indicating parameters for transmission of medium access control (MAC) layer data units in the wireless communication network, wherein the management frame excludes legacy capabilities elements for announcement of the parameters for transmission of MAC layer data units in the wireless communication network.

11. An access point configured for operation according to at least a first communication protocol, the access point comprising
a network interface device having one or more integrated circuit (IC) devices, wherein the one or more IC devices are configured to:
generate a management communication frame that includes information indicating network parameters of the wireless communication network, wherein the management communication frame includes information announcing an operating channel of the wireless communication network and identifying at least one primary component channel within the operating channel, the operating channel including i) the at least one primary component channel used at least for transmitting management information for the wireless communication network to client stations already associated with the access point and ii) at least one scanning channel specified, by the first communication protocol, to be used for client stations not associated with the access point to discover the access point;
generate a physical layer data unit to include the management communication frame; and
transmit the physical layer data unit in the at least one scanning channel to allow discovery of the wireless communication network by client stations that are not associated with the access point.

12. The access point of claim 11, wherein
the operating channel further includes one or more non-primary component channels different from the at least one primary component channel, and
the one or more IC devices are configured to transmit the physical layer data unit in the at least one scanning channel that corresponds to a non-primary component channel among the one or more non-primary component channels.

13. The access point of claim 12, wherein the one or more IC devices are configured to transmit duplicates of the physical layer data unit in the primary component channel of the operating channel and in the scanning channel that corresponds to the non-primary component channel of the operating channel.

14. The access point of claim 11, wherein the one or more IC devices are configured to generating the management communication frame at least by generating one of i) a beacon frame and ii) a probe response frame.

15. The access point of claim 11, wherein the one or more IC devices are configured to generate the physical layer data unit at least by generating a non-legacy physical layer data unit that i) conforms to a PHY format specified by the first communication protocol and ii) does not conform to any PHY format specified by any other communication protocol that is legacy with respect to the first communication protocol.

16. The access point of claim 15, wherein the one or more IC devices are configured to generate the non-legacy physical layer data unit to conform to one of i) a single user non-legacy physical layer data unit format specified by the first communication protocol and ii) an extended range single user non-legacy physical layer data unit format specified by the first communication protocol.

17. The access point of claim 15, wherein the one or more IC devices are configured to
generate the non-legacy physical layer data unit to conform to a multi-user non-legacy physical layer data unit format specified by the first communication protocol, and
generate the non-legacy physical layer data unit such that the management communication frame is transmitted using one or more resource units of the multi-user non-legacy physical layer data unit format.

18. The access point of claim 11, wherein the one or more IC devices are further configured to
select, among i) a mandatory modulation and coding scheme (MCS) specified for the wireless communication network and ii) an MCS selected from a set of basic MCS specified fir for the wireless communication network, an MCS for transmission of the management frame, and
transmit the physical layer data unit includes transmitting the management frame using i) the selected MCS and ii) a single spatial stream.

19. The access point of claim 11, wherein
the operating channel is in a first frequency band, and
the one or more IC devices are configured to transmit the management data unit in a second frequency band, different from the first frequency band, to allow discovery of the wireless communication network by client stations that are performing scanning in the second frequency band.

20. The access point of claim 11, wherein the one or more IC devices are configured to generate the management communication frame to conform to the first communication protocol and to include one or more of i) information indicating maximum power that client stations are permitted to utilize for a transmission in the first frequency band, ii) information indicating a lowest data rate permitted to be used for transmission in the first frequency band and iii) a non-legacy capabilities information element including information indicating parameters for transmission of medium access control (MAC) layer data units in the wireless communication network, wherein the management frame excludes legacy capabilities elements for announcement of the parameters for transmission of MAC layer data units in the wireless communication network.

* * * * *